(12) United States Patent
Moore et al.

(10) Patent No.: US 12,065,184 B2
(45) Date of Patent: Aug. 20, 2024

(54) MOBILITY DEVICE WITH DOUBLE CARGO BIN STACK

(71) Applicant: TOYOTA MOTOR NORTH AMERICA, INC., Plano, TX (US)

(72) Inventors: Douglas A. Moore, Fairview, TX (US); Paul Nichols, Healdsburg, CA (US); Tom Dair, Lafayette, CA (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 925 days.

(21) Appl. No.: 17/095,881

(22) Filed: Nov. 12, 2020

(65) Prior Publication Data

US 2022/0144329 A1     May 12, 2022

(51) Int. Cl.
| | |
|---|---|
| *B62B 5/00* | (2006.01) |
| *A61G 5/04* | (2013.01) |
| *A61G 5/08* | (2006.01) |
| *A61G 5/10* | (2006.01) |
| *A61H 3/00* | (2006.01) |

(52) U.S. Cl.
CPC ............... *B62B 5/002* (2013.01); *A61G 5/04* (2013.01); *A61G 5/0866* (2016.11); *A61G 5/10* (2013.01); *A61H 2003/002* (2013.01)

(58) Field of Classification Search
CPC ........ B62B 5/002; A61G 5/0866; A61G 5/04; A61G 5/10; A61H 2003/002
See application file for complete search history.

(56) References Cited

U.S. PATENT DOCUMENTS

| | | |
|---|---|---|
| 5,356,059 A | 10/1994 | Yanez et al. |
| 10,517,782 B2 | 12/2019 | Haynes |
| 2012/0118657 A1* | 5/2012 | Liao ............... A63B 55/61 180/208 |
| 2016/0144708 A1 | 5/2016 | Lee |
| 2020/0230822 A1* | 7/2020 | Sohmshetty ............ B25J 5/06 |
| 2020/0315880 A1* | 10/2020 | Raja .................. A61G 5/0833 |
| 2021/0059880 A1* | 3/2021 | Raja .................. A61G 5/1091 |
| 2021/0061396 A1* | 3/2021 | Wada ................. A61G 5/0833 |

FOREIGN PATENT DOCUMENTS

| | | | | |
|---|---|---|---|---|
| CN | 203988916 U | 12/2014 | | |
| CN | 208897240 U | 5/2019 | | |
| CN | 111343956 A | * | 6/2020 | ............ A61G 5/022 |
| WO | WO-2004083023 A2 | * | 9/2004 | ............ A61G 5/042 |

* cited by examiner

*Primary Examiner* — Jacob D Knutson
(74) *Attorney, Agent, or Firm* — DINSMORE & SHOHL LLP

(57) ABSTRACT

Systems and methods for a multi-function mobility device to provide cargo container transport are provided. A multi-function mobility device includes a frame configurable between a plurality of configurations. The frame includes a plurality of individually controllable wheeled leg members configured to traverse uneven terrain. The mobility device is configured to transform the frame into a cargo transport configuration that accepts two stacks of cargo bins locked together. The mobility device is also configured to transform the frame into a rideable configuration that accepts a person.

11 Claims, 18 Drawing Sheets

MOBILITY DEVICE WITH DOUBLE CARGO BIN STACK

TECHNICAL FIELD

Embodiments described herein generally relate to a multifunction mobility device and, more specifically, a multi-function mobility device that is configurable in a variety of configurations, such as a cargo transport device that can transport interlocking cargo containers with displays.

BACKGROUND

Persons in need of physical assistance require mobility devices to perform everyday tasks, such as moving from one place to another, reaching for objects, changing clothes, and the like. These different tasks may require either a caregiver and/or different assistive mobility devices. For example, a person may use a wheelchair and/or scooter to travel but may also have some capability of walking with assistance. Such a person may then have a wheelchair, scooter, and a walker device. However, such devices are bulky and take up valuable space in a person's home. Further, the person may want to walk after traveling away from home and his or her walker device. However, the walker device will be unavailable. Moreover, such persons may desire to transport items with them, or have items delivered to them. However, these conventional devices also lack the configurability to transform into a cargo transport mode that enables transportation of objects and secure containers of such items, such as cargo bins.

SUMMARY

In one embodiment, a multi-function mobility device includes a frame configurable between a plurality of configurations. The frame includes a plurality of individually controllable wheeled leg members configured to traverse uneven terrain. The mobility device is configured to transform the frame into a cargo transport configuration that accepts two stacks of cargo bins locked together. The mobility device is also configured to transform the frame into a rideable configuration that accepts a person.

In another embodiment, a multi-function mobility system includes a multi-function mobility device that has a frame configurable between a plurality of configurations. The frame includes a plurality of individually controllable wheeled leg modules configured to traverse uneven terrain. The mobility device is configured to transform into a cargo transport configuration that accepts two stacks of cargo bins locked together and transform into a rideable configuration that accepts a person. The frame also includes a plurality of actuators coupled to the frame and configured to reconfigure the frame between the plurality of configurations. The frame further includes a control unit communicatively coupled to the plurality of actuators, wherein the control unit is configured to operate the plurality of actuators to move the frame between the plurality of configurations. The multi-function mobility system further includes a cargo container having a cargo container interlocking system configured to transmit or receive power or data from another cargo container. The cargo container also includes a display configured to provide information regarding an item inside the cargo container.

In yet another embodiment, a method of cargo transport utilizing a multi-function mobility device is provided where the multi-function mobility device performs operations including reconfiguring a frame of the multi-function mobility device from a first mode into a cargo transport mode that differs from the first mode. The method also includes receiving a cargo container containing a requested item to be delivered at a specified location. The method further includes transporting the cargo container to the specified location. The method additionally includes displaying content on a screen on a side of the cargo container. The method also further includes authenticating a user at the specified location. The method still further includes providing the user access to the requested item within the cargo container based upon the authentication. The method also additionally includes departing the requested location without the requested item.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

A person may need various types of mobility devices for a variety of reasons, particularly when a person's mobility is compromised. Mobility devices such as wheelchairs, scooters, and walkers provide much needed assistance, but have limitations in terms of what they can provide, particularly individually. Along with mobility, people sometimes want to take an item with them, send an item, or have an item sent to them. Having a mobility device that already provides the mobility functionality of wheelchairs, scooters, and walkers, along with helping to transport specified items, can be very beneficial. Additionally, being able to receive information pertaining to the item from a display on the side of a cargo container securely containing the item can provide valuable information to users.

Further, along with secure and informative cargo storage, stable transport may be beneficial when unpredictable conditions such as rough or uneven terrain is encountered, which can slow down or even stop a non-adaptable mobility device.

Embodiments of the present disclosure are directed to a mobility device that can change into various modes, such as a collapsed transport and storage mode, a power wheelchair mode, a power walker/telepresence mode, a power scooter mode, and a cargo transport mode. Having such modes all within one device advantageously saves users from having to purchase and store many different machines. The cargo transport mode provides the ability to securely transport desired items, while allowing information about such items to be shown on a display of a cargo container transported by the cargo transport mode. This mode also provides wheeled legs that can move independently, which can increase the stability of the mobility device when traversing uneven terrain.

Figure 1A:
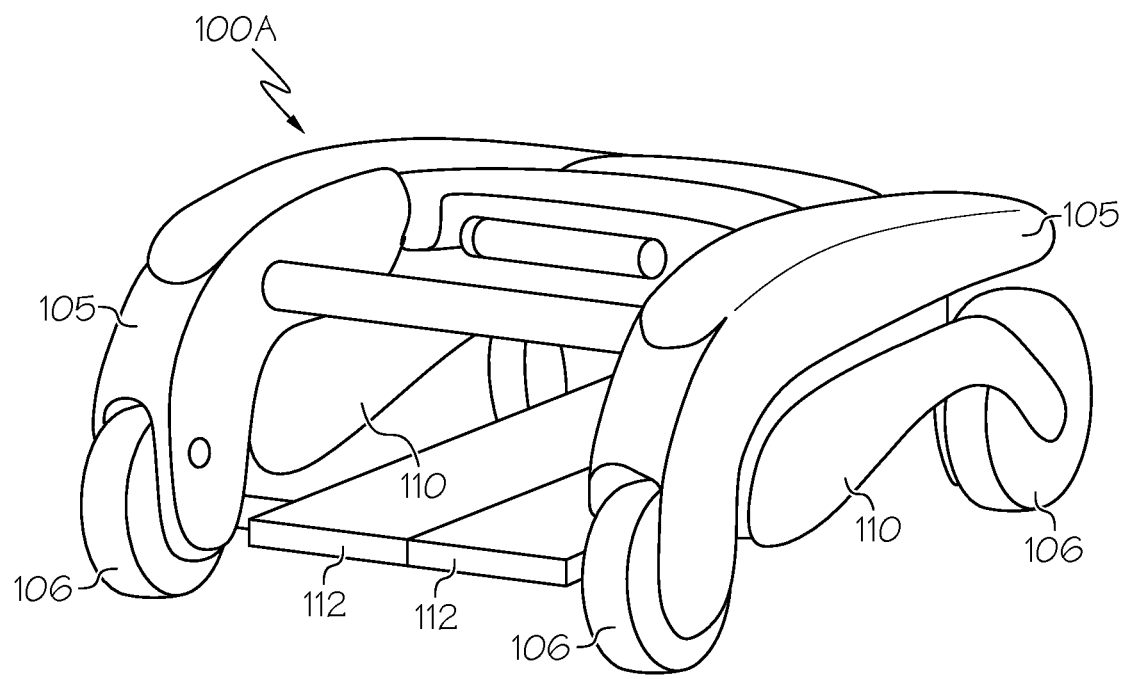
FIG. 1A schematically depicts a front view of an example collapsed transport and storage mode of a mobility device according to one or more embodiments described and illustrated herein.
Figure 1B:
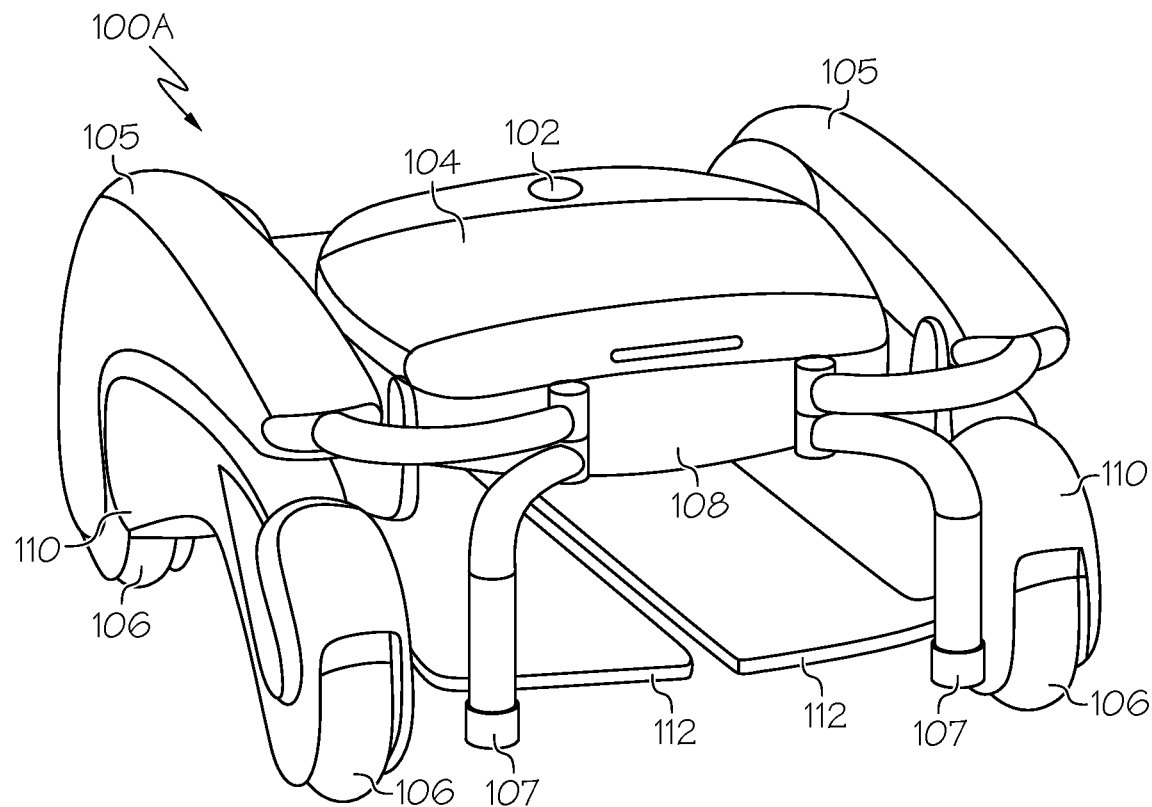
FIG. 1B schematically depicts a rear perspective view of the example collapsed transport and storage mode depicted by FIG. 1A according to one or more embodiments described and illustrated herein.

Referring now to FIGS. 1A and 1B, an example collapsed transport and storage mode of a mobility device is schematically illustrated. FIG. 1A is a front view and FIG. 1B is a rear view of the example of a collapsed transport and storage mode 100A of a mobility device. The collapsed transport and storage mode 100A includes a frame including a pair of wheeled leg member 110 having wheels 106, in which the length of the mobility device may be defined by a distance between each wheel 106 on a corresponding wheeled leg member 110. The mobility device further includes a pair of arms 105 extending from the pair of wheeled leg members 110, a seat member 108 may be provided between the pair of arms 105, and a pair of foot plates 112 may be pivotally attached to the pair of wheeled leg members 110. Each foot plate 112 may be rotatable between an unfolded position in which the foot plate 112 is horizontal and a folded position in which the foot plate 112 is vertical. Each foot plate 112 may have a length at least substantially equal to the length of the mobility device. These characteristics may remain generally the same among the other mobility device modes discussed herein. The mobility device may be powered, i.e., at least partially self-propelled, by a power source such as, for example, a battery or solar-powered. The power source may facilitate operation of the mobility device including transitioning between the different positions disclosed herein. As discussed further below, a base 120 may be used to provide power in some embodiments.

Each wheeled leg member 110 may include a pair of wheels 106 that may be powered by any suitable gears and motors for moving the mobility device. The wheels 106 may also may be permitted to be manually operated when the mobility device is pushed to reduce energy consumption. The arms 105 extend at an end of each wheeled leg members 110. An end of each arm 105 may be rotatably attached to an end of wheeled leg member 110. Each arm 105 may include a handle 107, which may include at least one control member (button, switch, etc.) for operating the mobility device such as, for example, powering on or off the mobility device, controlling a speed and/or direction of the mobility device, and transitioning between operating positions of the mobility device. The frame may include a seat member 108 provided between the pair of arms 105 and may be rotatable relative to the pair of arms 105. The seat member 108 may be positionable to a stowed position, as shown in FIGS. 1A-1B and 3A-3B, and in an open position, as shown in FIGS. 2A-2C.

The mobility device 10 further includes a pair of foot plates 112. Each foot plate 112 may be coupled to a corresponding one of the pair of the wheeled leg members 110 and rotatably attached thereto. Each foot plate 112 may have at least one or two hinges for rotatably attaching each foot plate 112 to a corresponding wheeled leg member 110. The foot plates 112 are operable between a horizontal position, as shown in FIGS. 1A and 1B, and a folded or upright position, as shown in FIG. 3B. When the foot plates 112 are in the unfolded position, the upper surface faces an upward direction and the lower surface faces an opposite downward direction. The foot plates 112 are configured to support a user and/or cargo being transported. Each foot plate 112 may be manually operated to position the foot plates 112 between the unfolded position and the folded position. However, in embodiments, the foot plates 112 may include any suitable powered mechanism such as, for example, a motor or actuator, for automatically positioning the foot plates 112 between the unfolded position and the folded position. When the foot plates 112 are powered, the foot plates 112 may be operated by utilizing a control member on the handles 107 associated with each arm 105. The frame may also feature a camera 102 and an exterior display 104. As discussed in more detail below, this may provide for video conferenced communication, although these may not be active in the collapsed transport and storage mode 100A. For example, the camera 102 and an exterior display 104 may provide telepresence/video conferencing functionality equivalent to the cargo containers 118 discussed herein.

In the collapsed transport and storage mode 100A, the mobility device the frame may be utilized to transport smaller objects, such as where a lower or smaller profile would be needed, such as a tunnel or other area with a low ceiling. In some embodiments, the collapsed transport and storage mode 100A, is also the mode most amendable for storage due to its compact configuration that can fit into smaller spaces than the other modes discussed below.

Figure 2A:
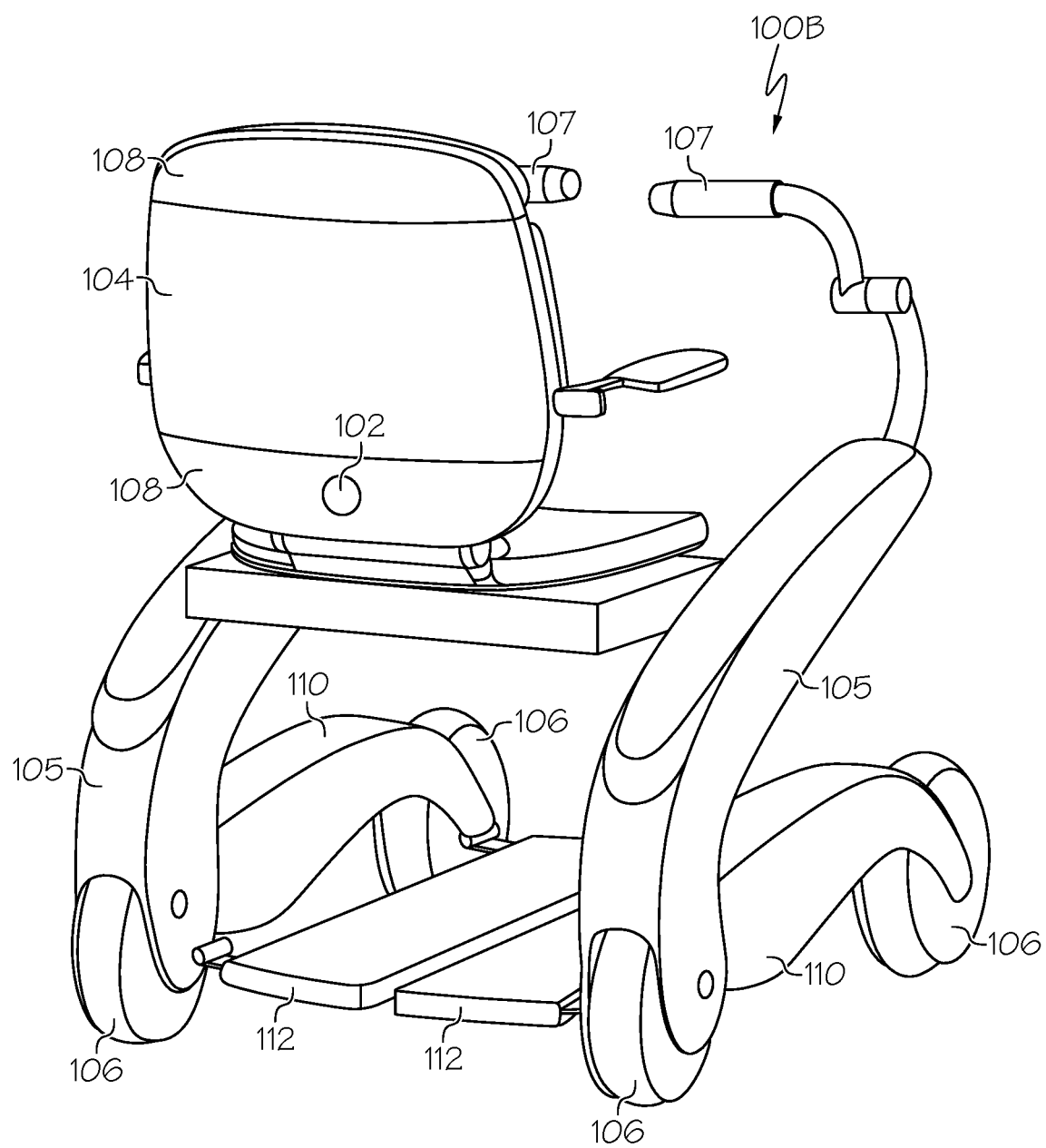
FIG. 2A schematically depicts a rear view of an example power wheelchair mode of a mobility device according to one or more embodiments described and illustrated herein.
Figure 2B:
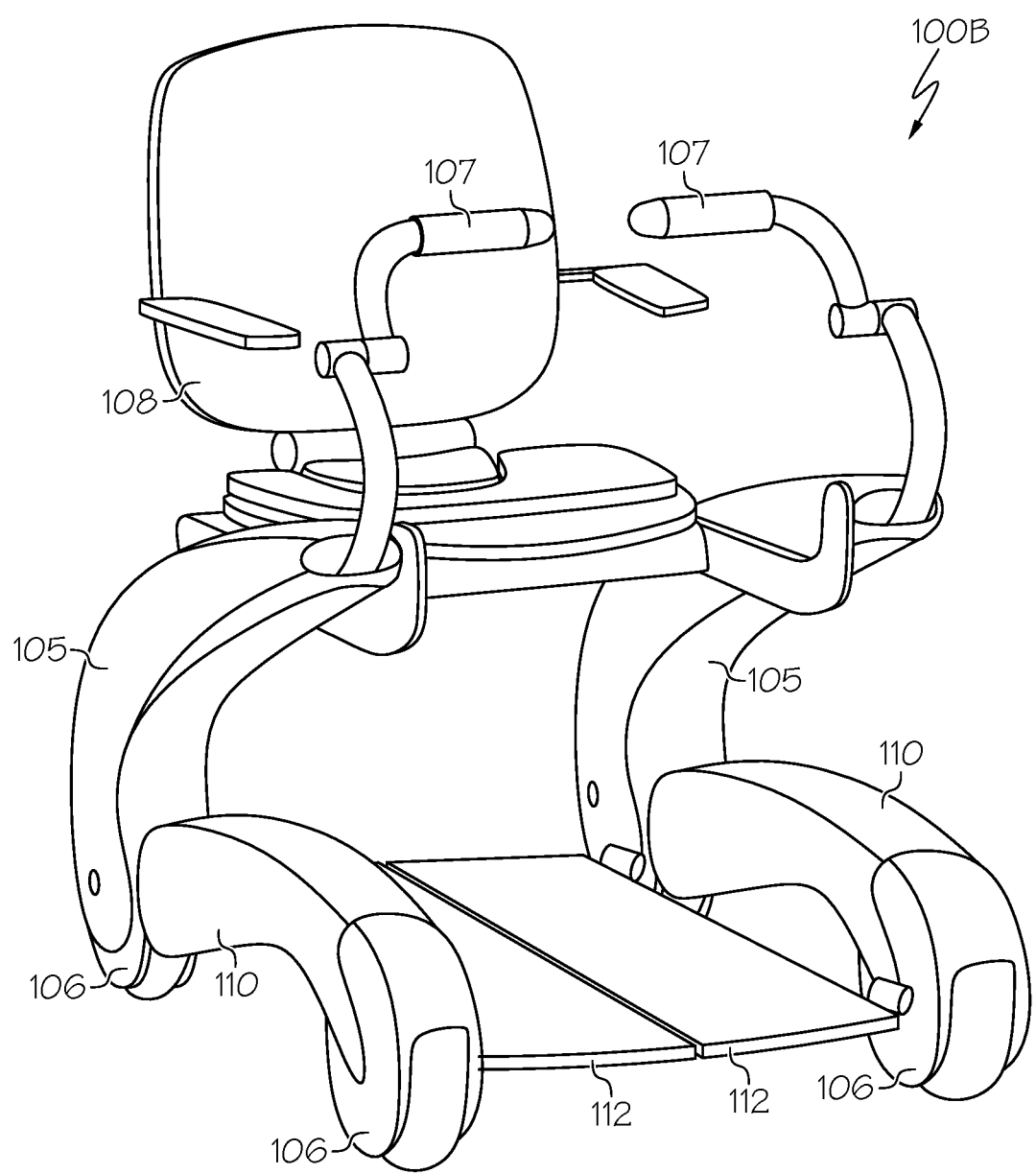
FIG. 2B schematically depicts a front view of an example power wheelchair mode of a mobility device depicted by FIG. 2A according to one or more embodiments described and illustrated herein.
Figure 2C:
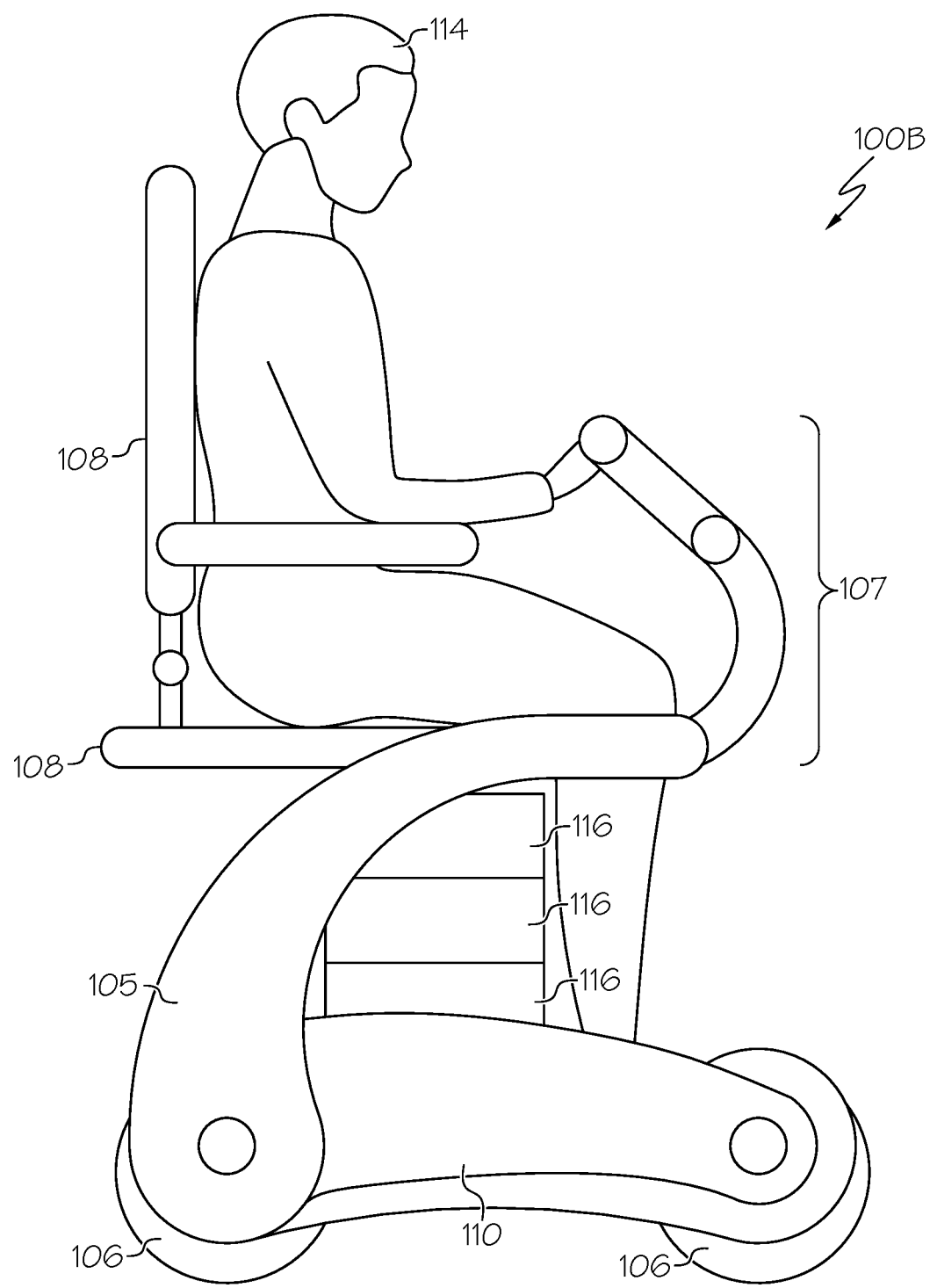
FIG. 2C schematically depicts a side view of an example power wheelchair mode of a mobility device depicted by FIG. 2A with under-seat containers beneath a riding user according to one or more embodiments described and illustrated herein.

Referring now to FIGS. 2A, 2B, and 2C, an example power wheelchair mode of a mobility device is schematically illustrated. FIG. 2A is a rear view, FIG. 2B is a front view, and FIG. 2C is a side view, with a rider with under-seat containers, of the example power wheelchair mode 100B of a mobility device. In the power wheelchair mode 100B, the seat member 108 may include a seat surface extending horizontally to support a sitting user. As depicted in FIGS. 2A-2B, the arms 105 may be raised so that the handles 107 can be at appropriate height. Additionally, the power wheelchair mode 100B provides storage space below the seat member 108, as depicted in FIG. 2C. In this embodiment, a user 114 is seated upon the seat member 108 and grasps the handles 107. In embodiments, the height and/or overall position of the seat member 108 may be adjusted by the user 114 and/or the mobility device. A plurality of under-seat containers 116 is stowed underneath the seat member 108 and atop one or both foot plates. Embodiments of the under-seat containers 116 may utilize any functionality or structure described herein with respect to the storage containers 118 described herein. In this embodiment, under-seat containers 116 are attached to the underside of the seat member 108 and attached to each other therefrom. In one embodiment, the under-seat containers may sit atop the foot plates 112. As discussed in more detail with respect to FIG. 5E for cargo containers 118, having under-seat containers 116 reside on only one foot plate 112 may allow the mobility device to adapt to uneven terrain by having one side at the rear raise/lower independent of the other side.

Figure 3A:
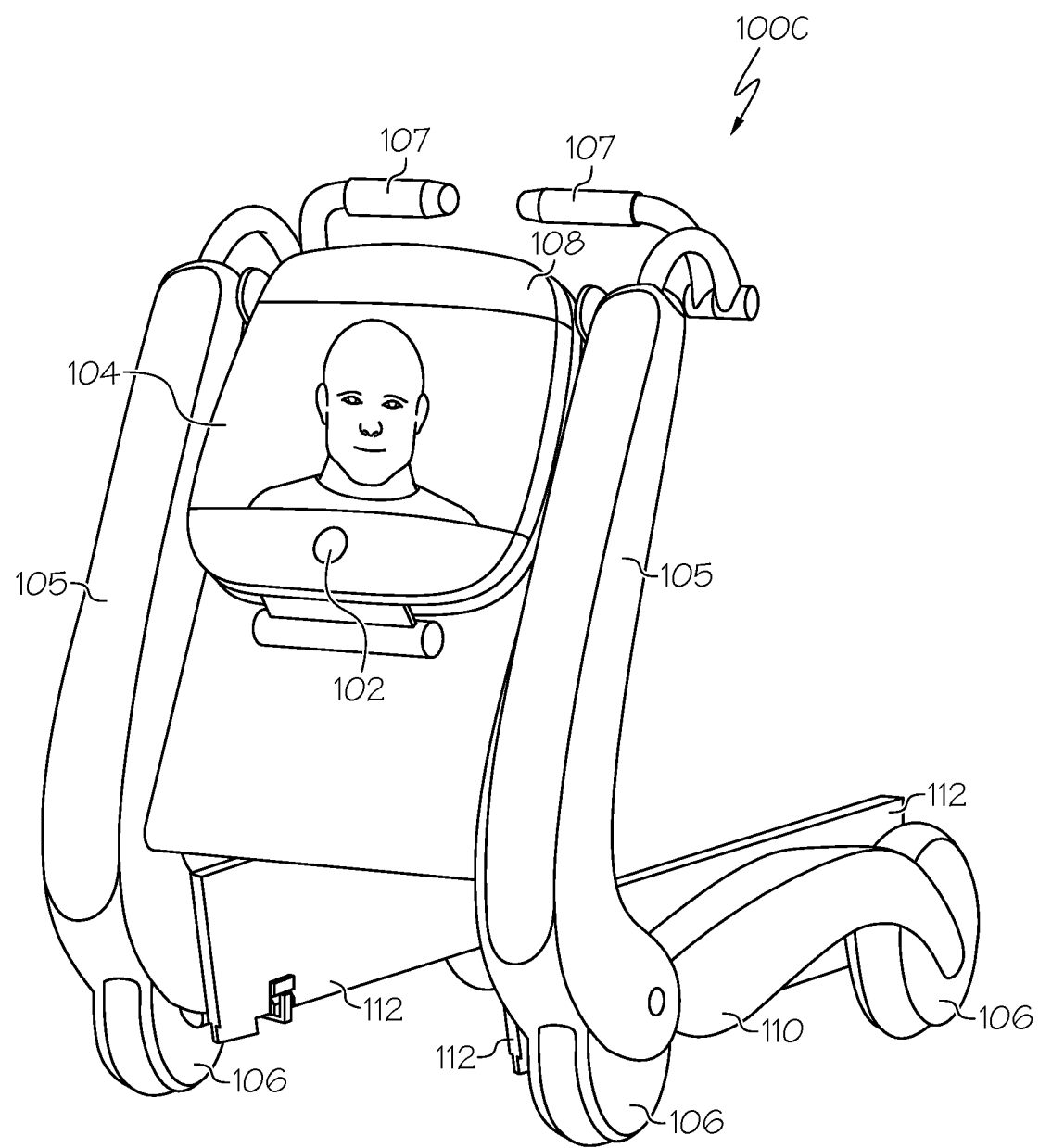
FIG. 3A schematically depicts a front view of an example power walker mode of a mobility device according to one or more embodiments described and illustrated herein.
Figure 3B:
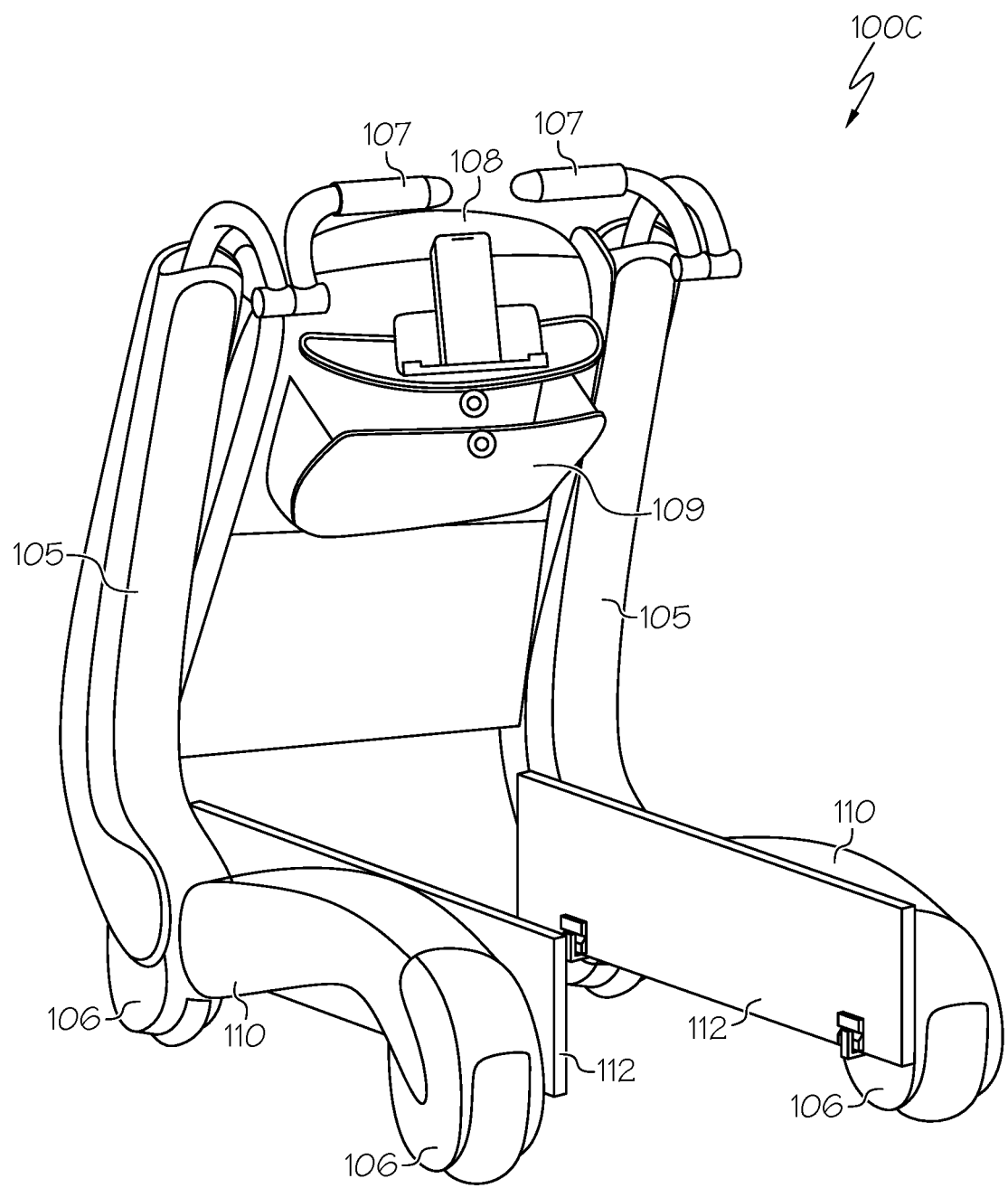
FIG. 3B schematically depicts a rear view of an example power walker mode of a mobility device depicted by FIG. 3A according to one or more embodiments described and illustrated herein.

Referring now to FIGS. 3A and 3B, an example power walker mode of a mobility device is schematically illustrated. FIG. 3A is a front view with a telepresence display, and FIG. 3B is a rear view of the example power walker mode 100C of a mobility device. In the power walker mode 100C, the foot plates 112 raise into a folded position, wherein the upper surface faces the corresponding wheeled leg member 110 to which it is rotatably coupled, while the lower surface faces of the foot plates 112 face away from the adjoined wheeled leg member 110 and toward the opposite wheeled leg member 110. In this way, a user can walk while holding onto the handles 107. The embodiment depicted in FIG. 3A also features a telepresence/video-conferencing mode utilizing one or both of the camera 104 and microphone 102, as discussed in more detail below. Although depicted in use in the power walker mode 100C, video-conferencing may be utilized in any suitable mode.

Figure 4A:
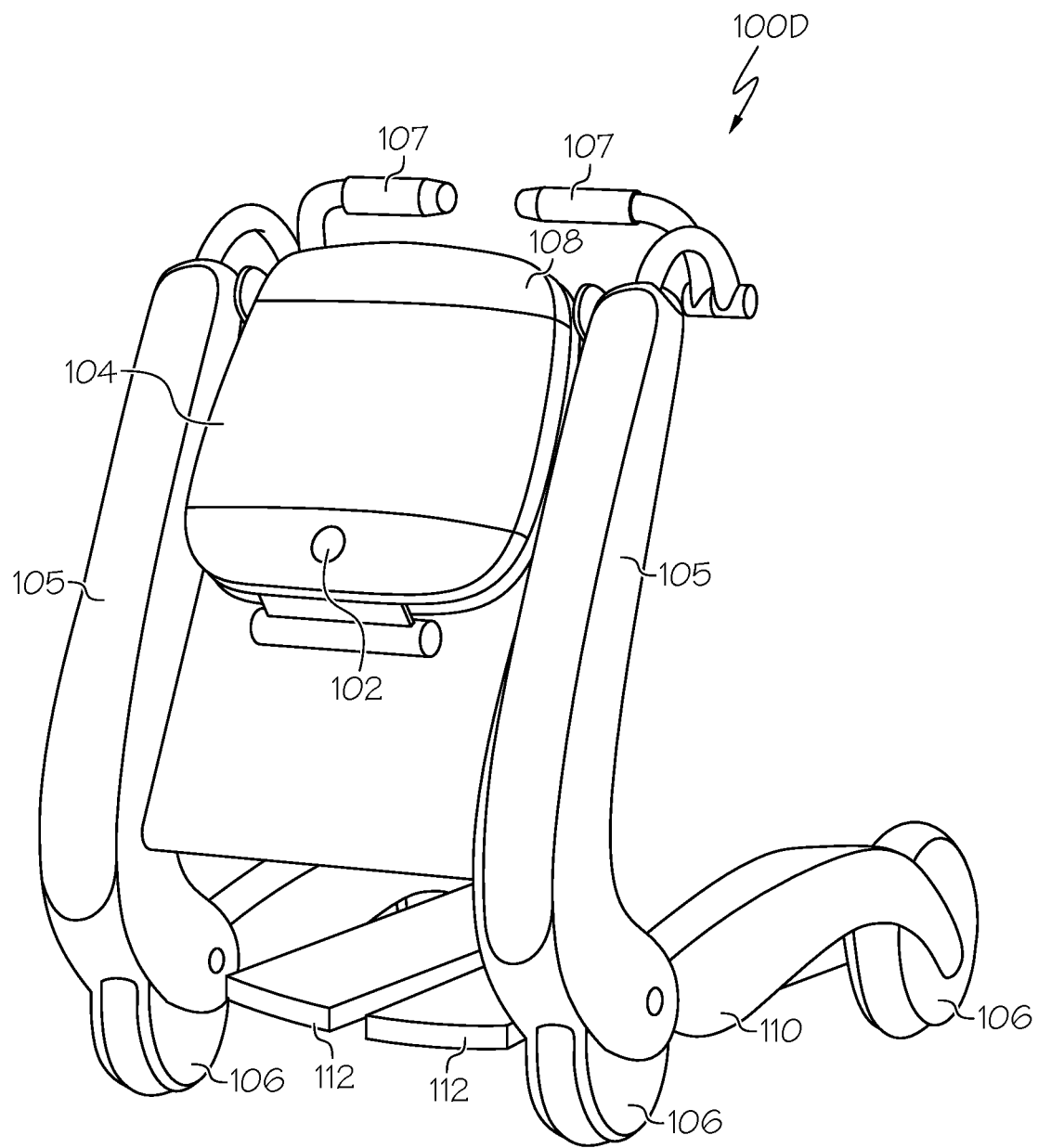
FIG. 4A schematically depicts a front view of an example power scooter mode of a mobility device according to one or more embodiments described and illustrated herein.
Figure 4B:
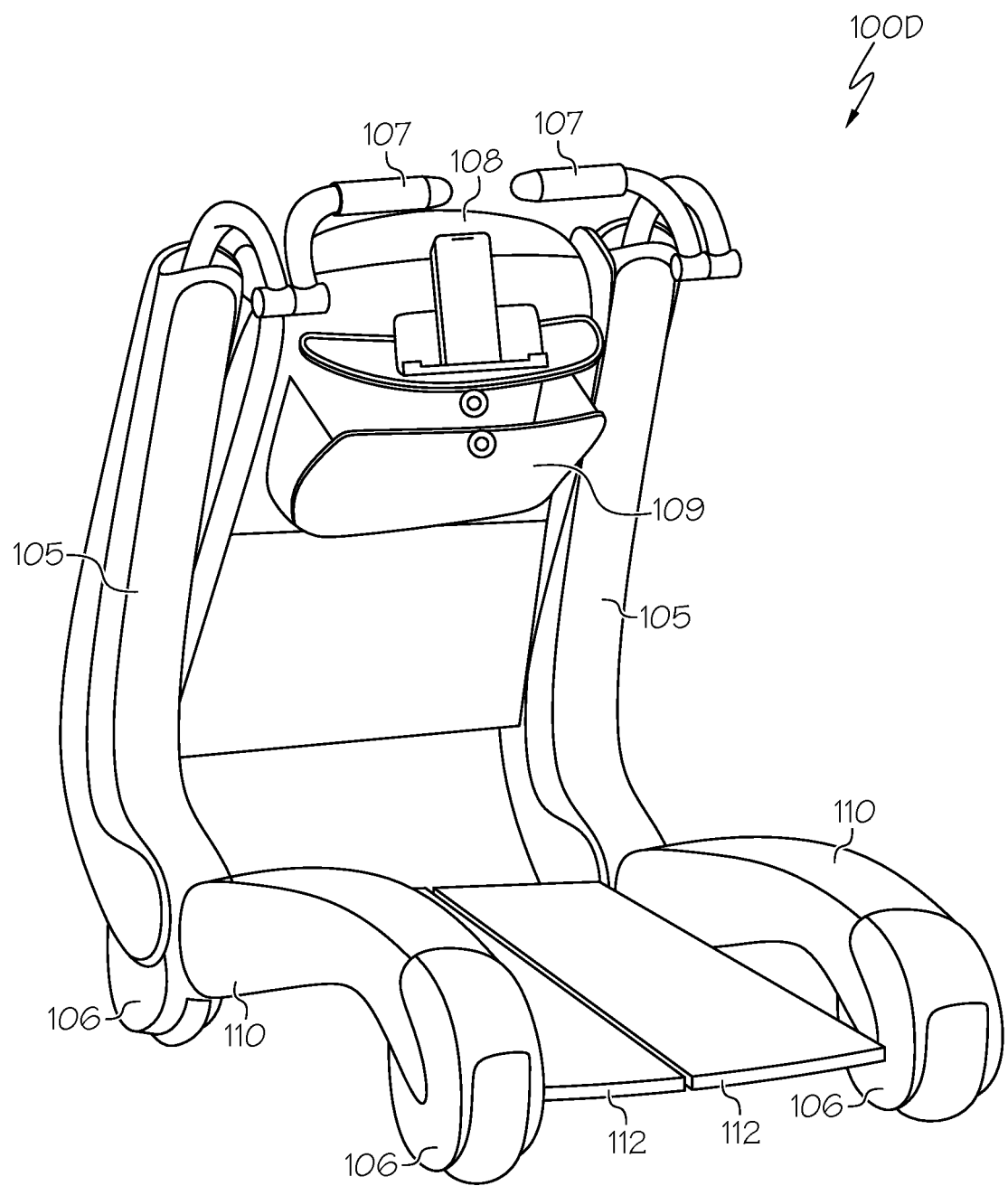
FIG. 4B schematically depicts a rear view of an example power scooter mode of a mobility device depicted by FIG. 4A according to one or more embodiments described and illustrated herein.
Figure 4C:
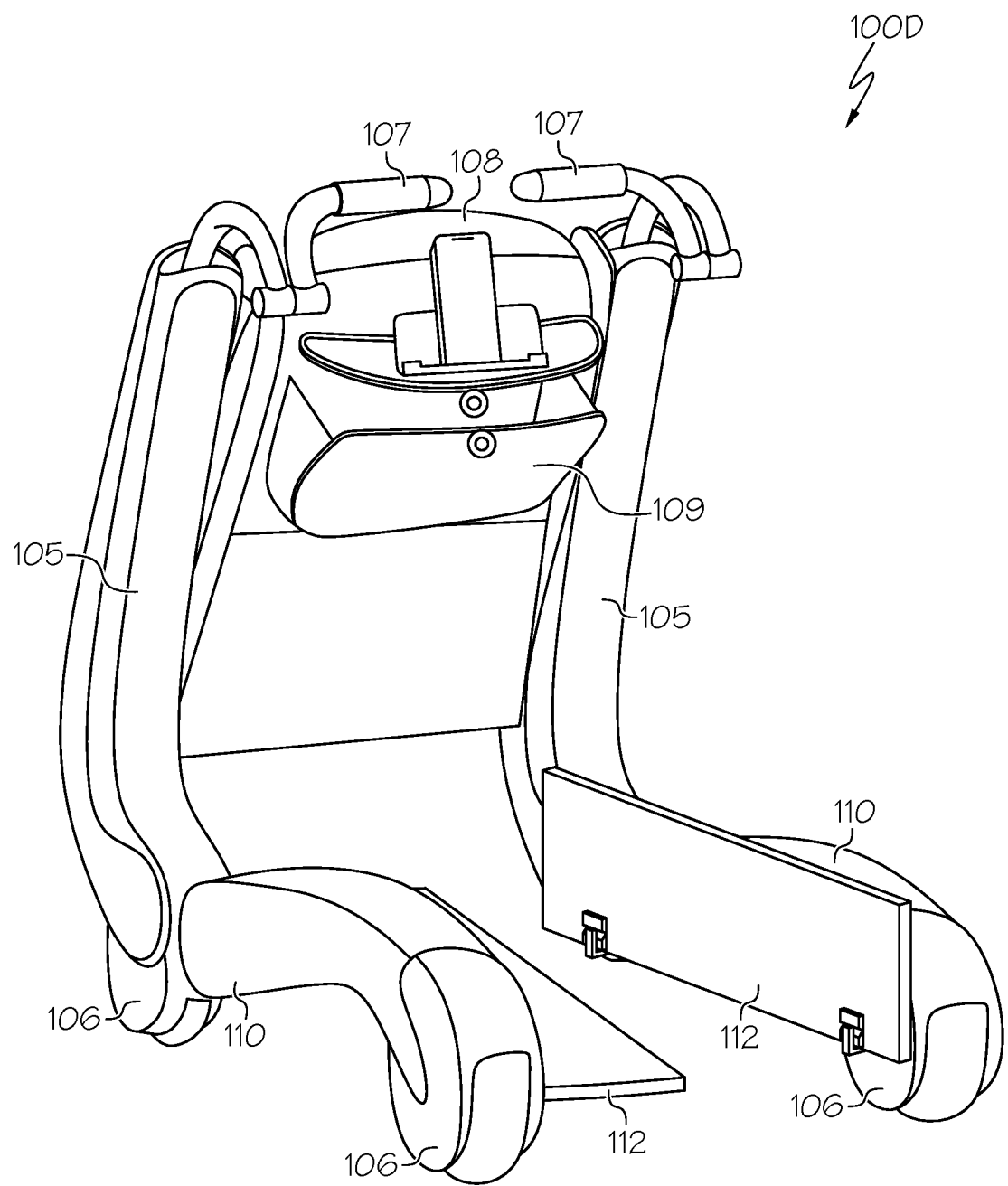
FIG. 4C schematically depicts a rear view of an example power scooter mode of a mobility device depicted by FIG. 4B with a raised foot plate according to one or more embodiments described and illustrated herein.

Referring now to FIGS. 4A, 4B, and 4C, an example power scooter mode of a mobility device is schematically illustrated. FIG. 4A is a front view, FIG. 4B is a rear view, and FIG. 4C is a rear view of the example power scooter mode 100D of a mobility device with one raised floor plate 112. By keeping the foot plates 112 lowered, the power scooter mode 100D allows a user (not shown) to stand upon the foot plates 112 to ride the mobility device while grasping the handles 107.

Figure 5A:
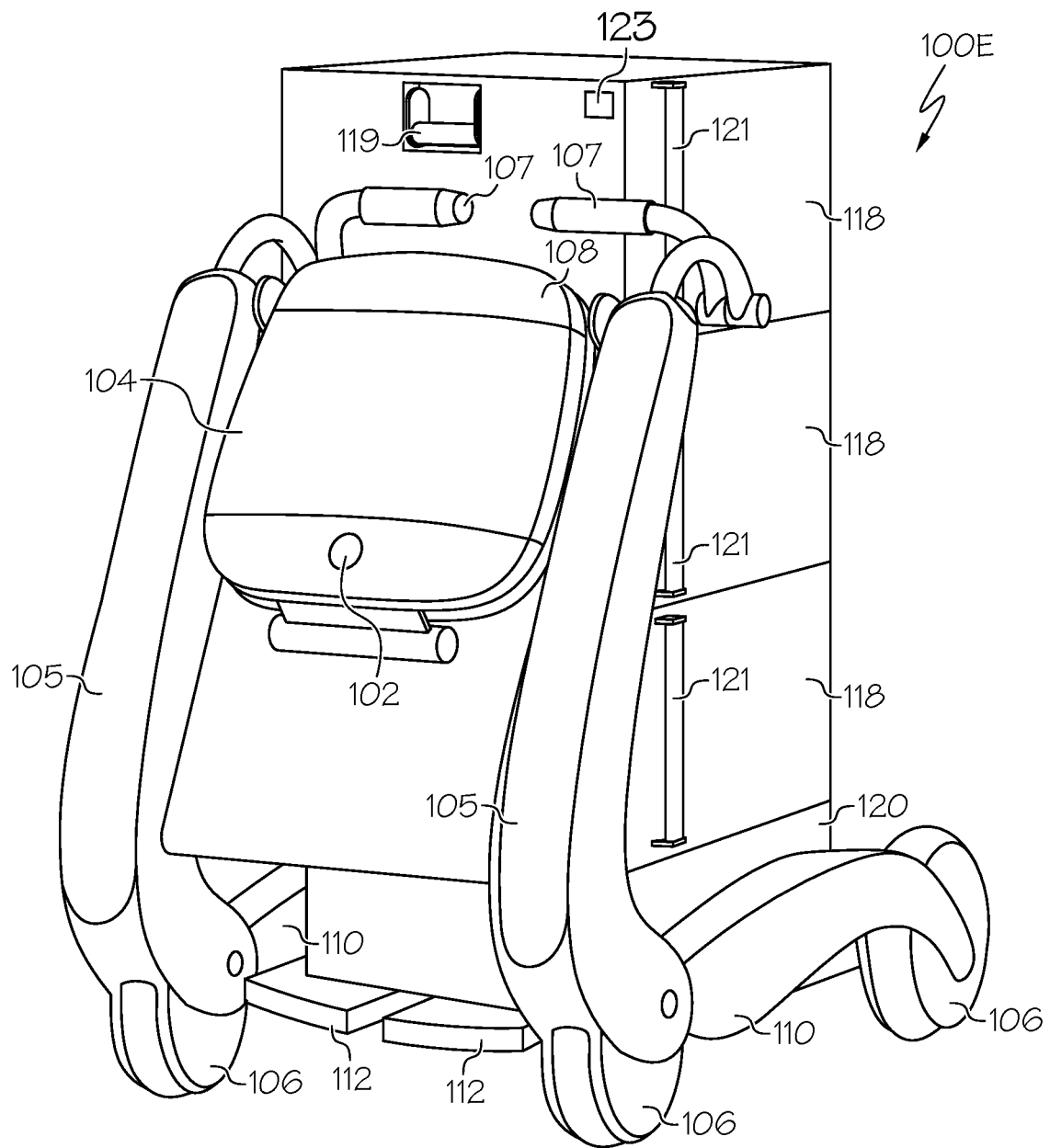
FIG. 5A schematically depicts a front view of an example cargo transport mode of a mobility device transporting a stack of cargo containers according to one or more embodiments described and illustrated herein.
Figure 5B:
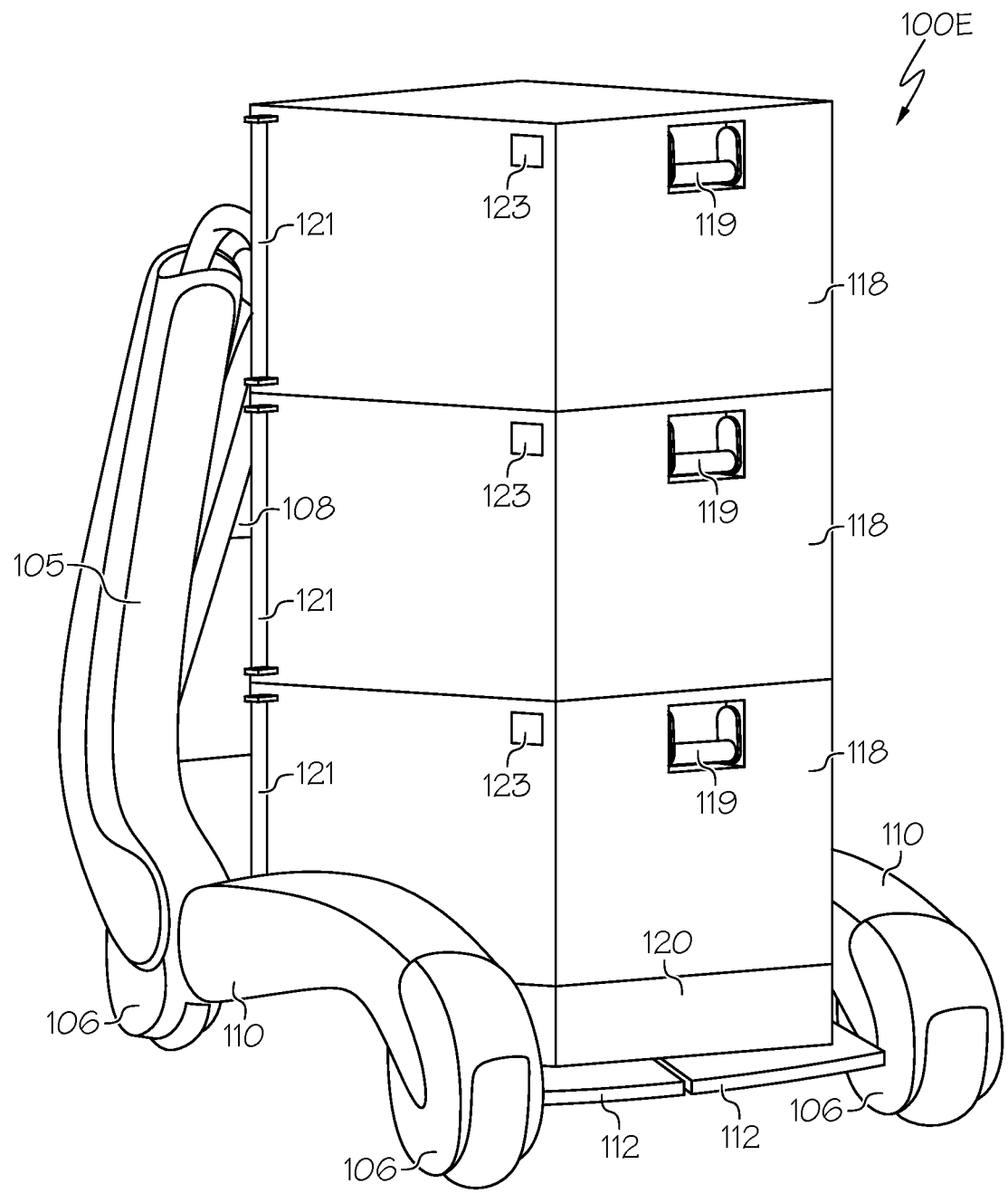
FIG. 5B schematically depicts a rear view of an example cargo transport mode of a mobility device depicted in FIG. 5A transporting a stack of cargo containers according to one or more embodiments described and illustrated herein.
Figure 5C:
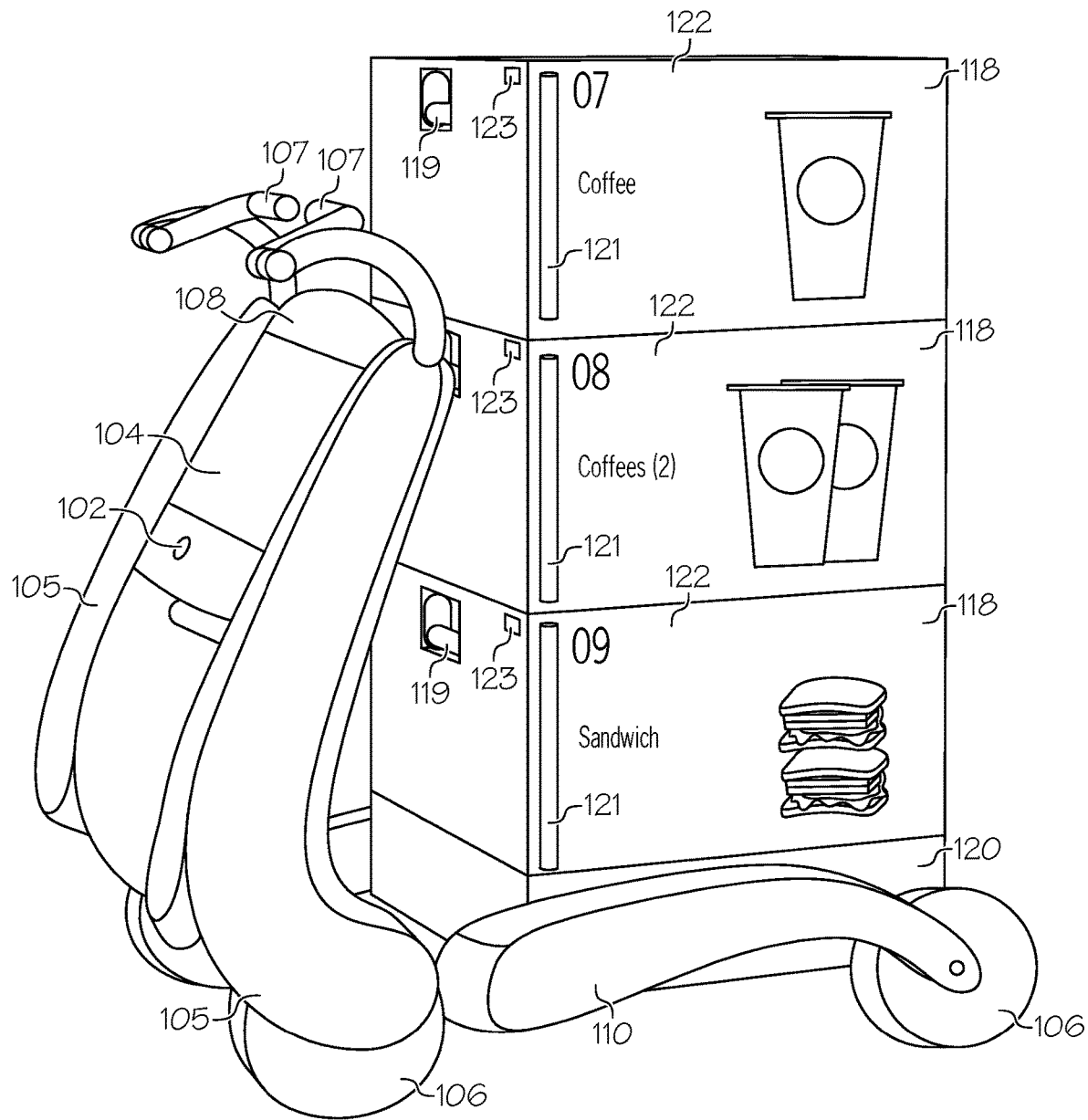
FIG. 5C schematically depicts a side perspective view of an example cargo transport mode of a mobility device transporting a stack of cargo containers having displays according to one or more embodiments described and illustrated herein.
Figure 5D:
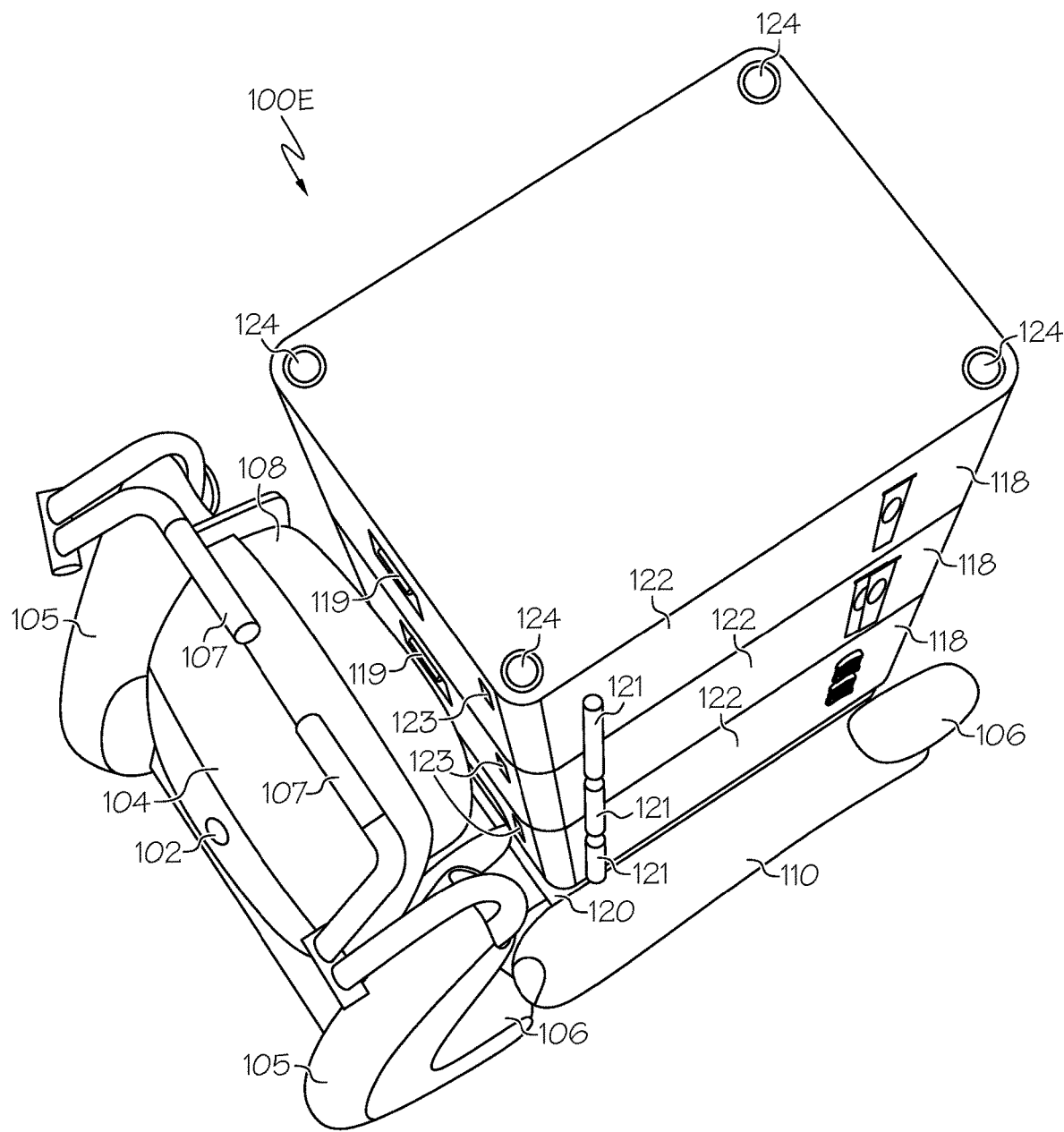
FIG. 5D schematically depicts a top perspective view of an example cargo transport mode of a mobility device depicted in FIG. 5C transporting a stack of cargo containers having displays according to one or more embodiments described and illustrated herein.
Figure 5E:
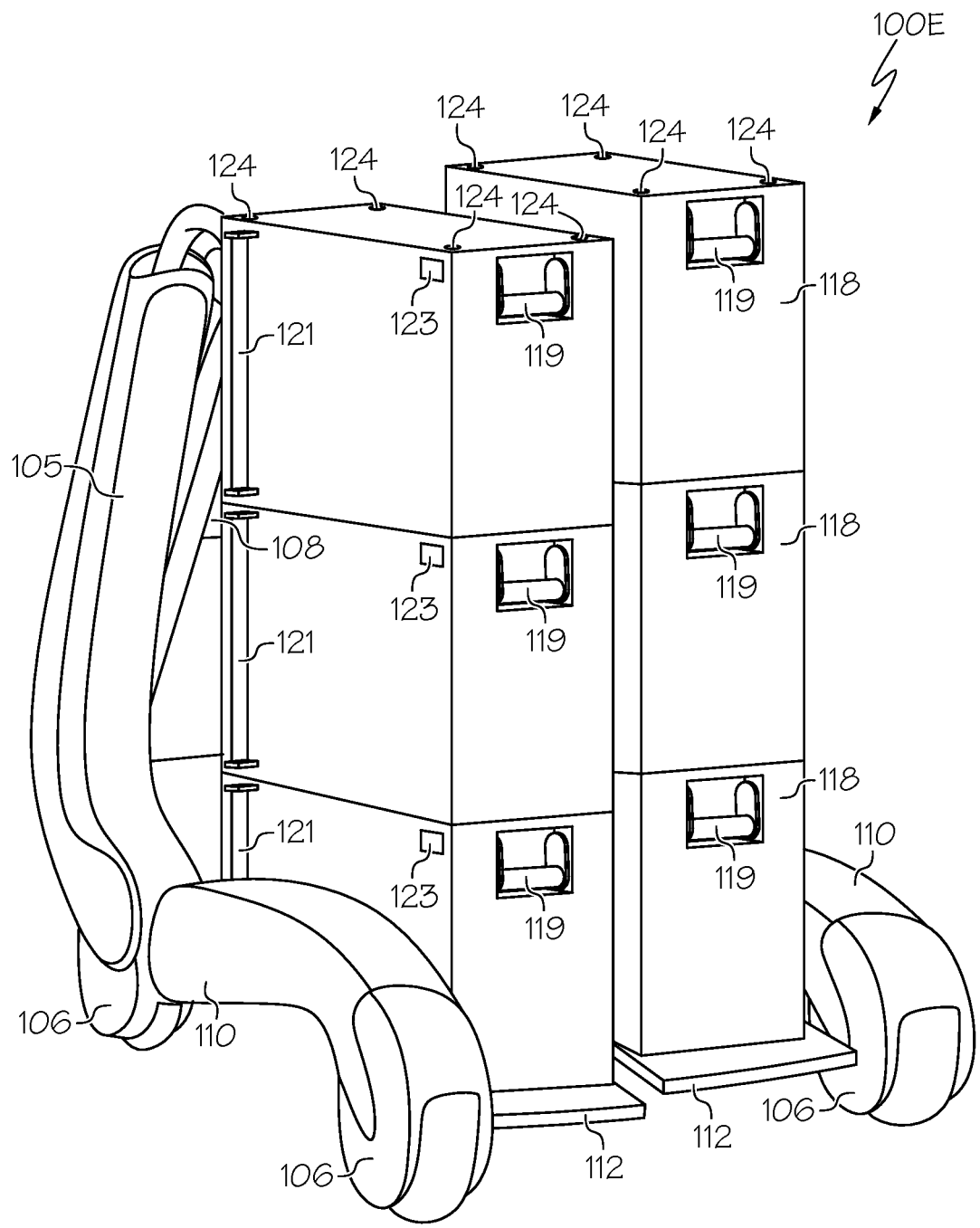
FIG. 5E schematically depicts a rear view of an example cargo transport mode of a mobility device transporting two stacks of cargo containers according to one or more embodiments described and illustrated herein.

Referring now to FIGS. 5A, 5B, 5C, 5D, and 5E, an example cargo transport mode of a mobility device is schematically illustrated. FIG. 5A is a front view of the cargo transport mode 100E with a stack of cargo containers 118, FIG. 5B is a rear view, FIG. 5C is a side perspective view in which the cargo containers 118 have cargo container displays 122, FIG. 5D is a top view, and FIG. 5E is a rear view of the cargo transport mode 100E with two stacks of cargo containers 118. In FIGS. 5A and 5B, a stack of cargo containers 118 sits atop a base 120, where the base 120 is depicted as spanning the foot plates 112. As discussed further below, the base may be utilized to provide power to the mobility device and/or facilitate with data communication with one or more cargo containers 118. For example, the base 120 may act as a battery, and can allow the mobility device to provide motorist assistance, such as being able to provide a jump to a vehicle with a dead battery.

The cargo container 118 that sits directly atop the base 120 may receive power, data, heating, cooling, and the like, from the base 120. In this embodiment, the base 120 may also act as a conduit for data transmissions and/or power between the mobility device and one or more cargo containers 118, including cargo containers 118 not directly in contact with the base 120. A cargo container 118 in direct contact with the base may, in turn, act as a conduit for power and/or data to other cargo containers 118 sitting above it. The cargo containers 118 may interlock with each other, which can increase stability. Embodiments of the cargo containers 118 may be insulated and/or provide temperature control (heating/cooling) for temperature-sensitive items such as foods and medications. The cargo containers 118 may have side handles 119 for carrying. The cargo containers 118 in this embodiment are secure containers that may be opened with a front handle 121 once unlocked. As discussed further below, a cargo container 118 may feature an authentication device 123 that may be any device or combination of device for authenticating a user, such as a camera, microphone, biometric scanner, and the like.

In the embodiment depicted in FIGS. 5C-5D, the cargo containers 118 feature container displays 122. The displays 122 may provide any suitable type of information, such as anything that relates to the item(s) contained inside. As depicted in FIG. 5C, the displays 122 may display content pertaining to the item contained inside, such as graphics/images/videos (coffee, sandwich, etc.), text, an item number, a scannable code (QR code, bar code, and the like), current temperature inside the container, and the like. In some embodiments, advertisements may be presented, such as presenting related items/services on the container display 122 when the item inside is being retrieved. In another embodiment, the authentication device 123 and the container display 122 are on the same side of a cargo container 118 to facilitate telepresence/video conferencing. For example, after being authenticated, a user picking up a prescription may request or be required to do a video consultation with a medical professional prior to the cargo container 118 being unlocked.

FIG. 5D depicts a cargo container interlocking system 124 which may allow cargo containers 118 to form stable stacks by interlocking the top of one cargo container 118 with the bottom of another cargo container 118 (such as allowing the cargo containers 118 snap together). The cargo container interlocking system 124 may additionally provide for the flow of power and/or data between cargo containers 118 in a stack, the mobility device in cargo transport mode 100E, and/or a base 120. Any suitable types of electrical and/or data conduits may be utilized. In other embodiments, power and/or data may be transferred wirelessly (i.e., without direct contact) between cargo containers 118 in a stack, the mobility device in cargo transport mode 100E, and/or a base 120. For example, a cargo container 118 at the top of a stack may transmit data conveying its current internal temperature and required temperature (such as based on the requirements of the item contained therein). In response, the mobility device may transmit data containing a response and power to help the top cargo container 118 maintain its temperature. In another example, the base 120 may be utilized to provide power to a cargo container 118 to start or continue displaying content on its container display 122, or to conduct authentication of a user via the authentication device 123.

In the embodiment depicted in FIG. 5E, the wheeled leg members 110 act independently, instead of together, such that they separately raise/lower according their hinged connection the respective arms 105, which can help to counteract uneven surfaces encountered, such as differences in slope between the left/right sides of the mobility device in cargo transport mode 100E. In the example shown, the left side of the mobility device (i.e., the wheeled leg member 110, left rear wheel 106, left foot plate 112, and left stack of cargo containers 118) is lower than their right-side counterparts. This would be due, for example, to the terrain under the left side being lower than on the right side. It should be noted that the cargo containers 118 in this embodiment, though slimmer than the cargo containers 118 depicted in FIGS. 5A-5D, may maintain all the same functionality. This separated raising/lowering may be utilized in the other modes described herein as well, such as collapsed transport and storage mode 100A, power wheelchair mode 100B, power walker/telepresence mode 100C, and/or power scooter mode 100D.

Figure 6A:
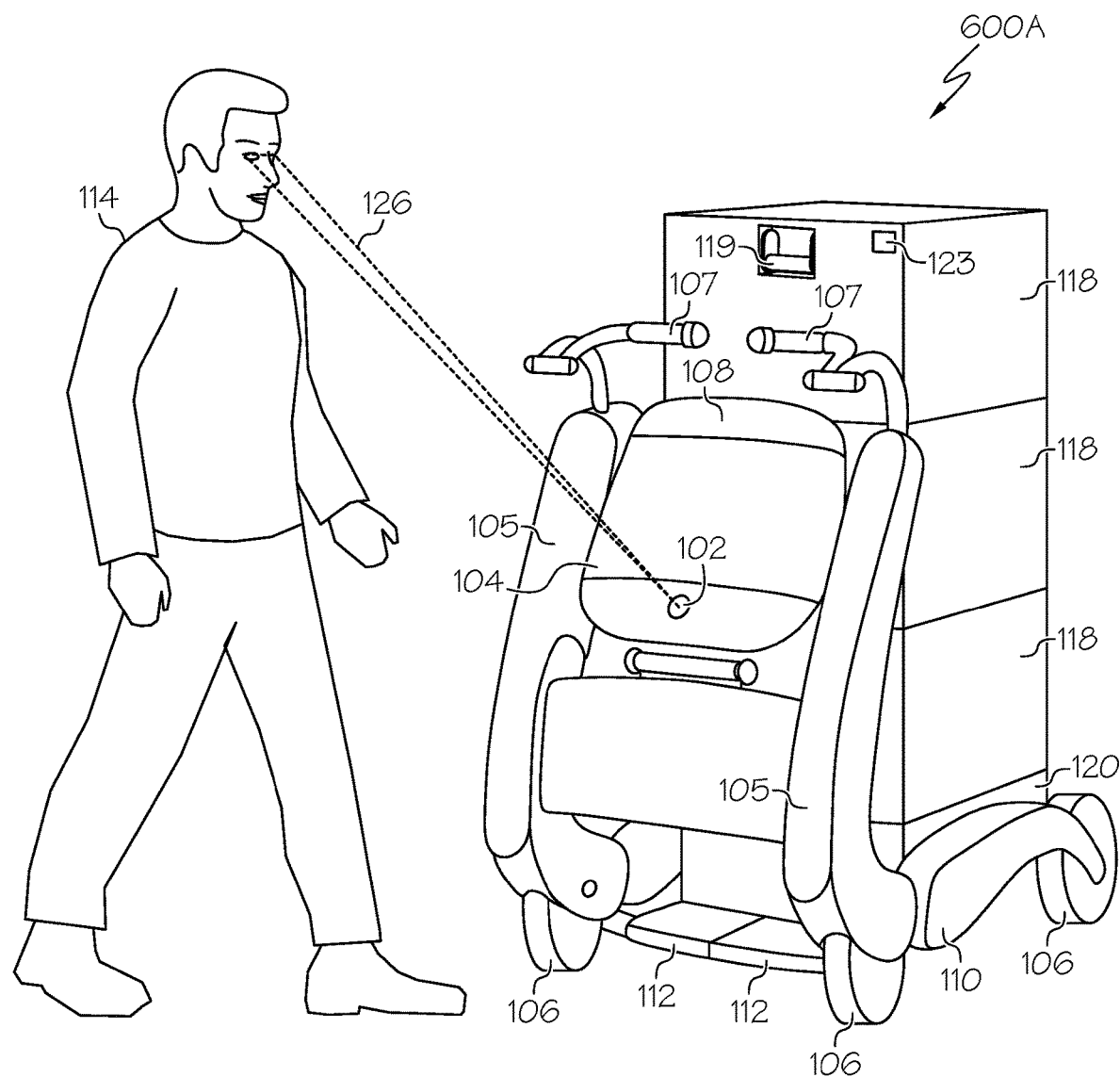
FIG. 6A schematically depicts a front view of an example cargo transport mode of a mobility device with a stack of cargo containers performing biometric authentication according to one or more embodiments described and illustrated herein.

Referring now to FIG. 6A, a front view of an example cargo transport mode 100E of a mobility device with a stack of cargo containers performing biometric authentication is schematically illustrated. In this embodiment, a user 114 has approached the mobility device and is being authenticated 126 by the camera 102 of the mobility device. In this example, the eyes of the user 114 are being scanned, although any suitable form of authentication 126 may be utilized, such as facial recognition, voice analysis, fingerprint scanning (such as via the exterior display 104, the authentication device 123, and/or container display 122), scanning a user's identification (such as government-issued ID), code (such as a QR code displayed on their phone), a password entered on a touchscreen display (such as via the exterior display 104 and/or container display 122), and the like. Authentication may be used for the delivery of a variety of items such as food, medications, documents (including confidential documents), and the like. The authentication functionality described herein with respect to the mobility device may be performed by cargo containers 118. Relevant content may be shown to the user 114 on not only the display of the cargo container 118 containing the item sought, but also on other cargo containers 118 and/or the exterior display 104 of the mobility device.

Figure 6B:
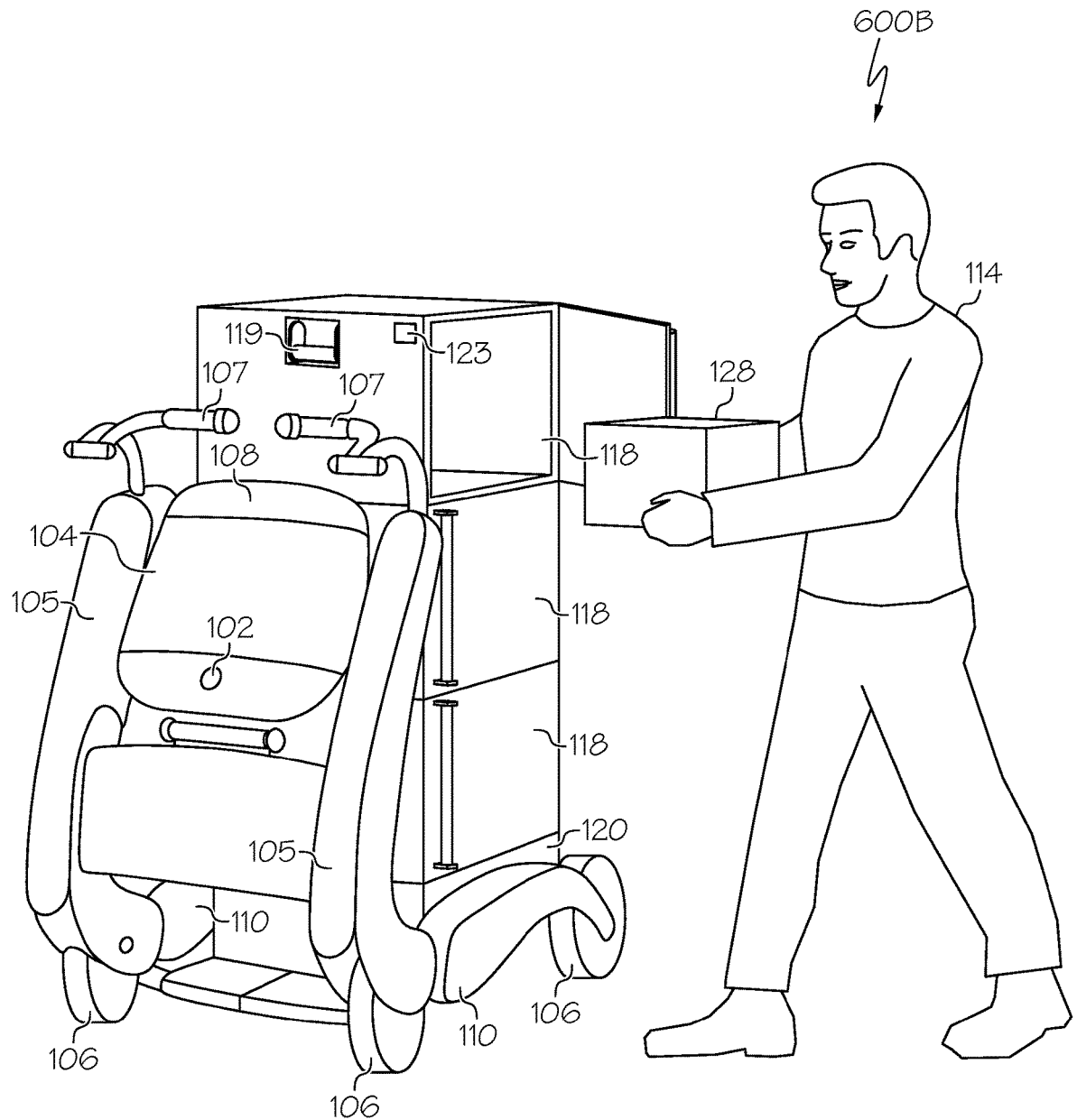
FIG. 6B schematically depicts a front view of an example cargo transport mode of a mobility device providing access to an item within one of the cargo containers according to one or more embodiments described and illustrated herein.

Referring now to FIG. 6B, an example a front view of an example cargo transport mode of a mobility device with a stack of cargo containers performing biometric authentication is schematically illustrated. Based upon the user 114 having been authenticated, the corresponding cargo container 118 unlocks and allows the user 114 to open it and take the item 128 inside. In some embodiments, the cargo container 118 may open itself so that the user 114 need only reach inside to retrieve the item 128. In other embodiments, cargo containers 118 may utilize other security measures such as lock and key, or may not be locked (such as in a secure facility, for example, where only select users would have access).

Figure 7:
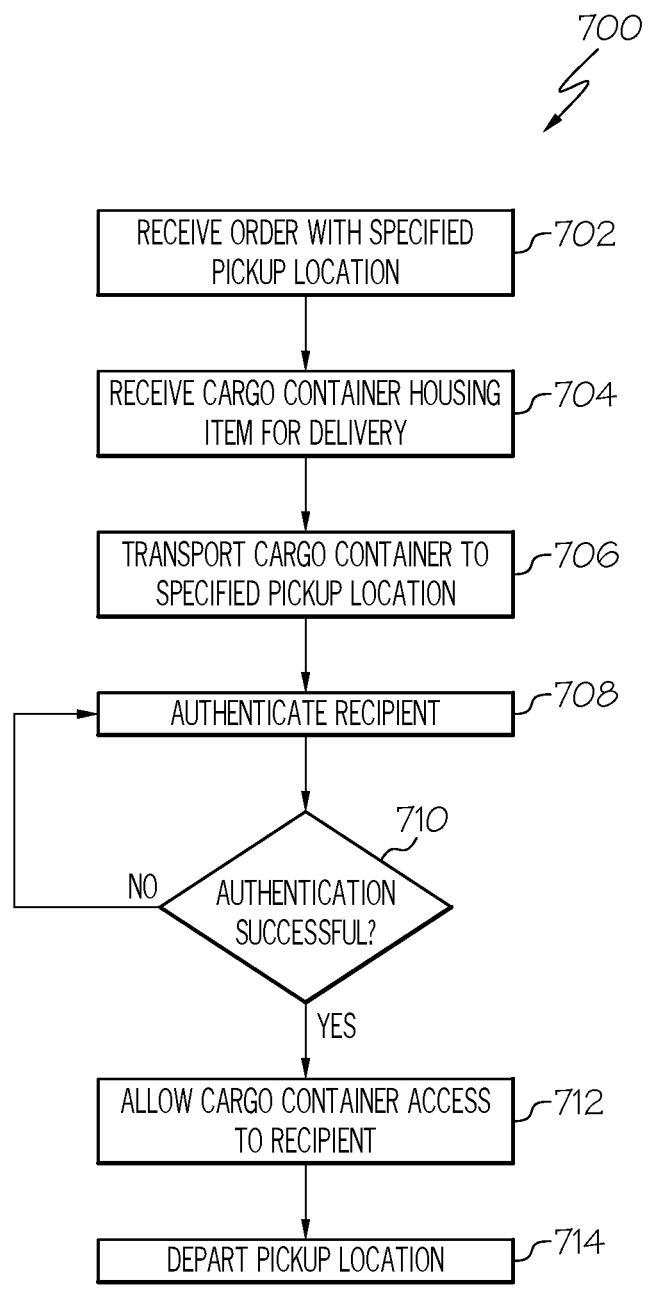
FIG. 7 is a flow chart depicting an exemplary process of illustrates an exemplary process of utilizing the cargo transport mode of the mobility device to deliver one or more items to a user at a specified location, according to one or more embodiments described and illustrated herein.

Turning now to FIG. 7, a flowchart 700 illustrates an exemplary process for the cargo transport mode of the mobility device to deliver one or more items to a user at a specified location (specified by the user or any other suitable party or software). At block 702, an order from a user is received by the mobility device. This may be, by way of non-limiting example, for warehouse goods purchased by a user and the mobility device is either located at the warehouse or travels to the warehouse, in which the goods are contained in one or more cargo containers. In another example, the user may have placed an order for a prescription from a pharmacy, such that the mobility device travels to the pharmacy to receive a cargo container containing the prescription by the requesting user. In another embodiment, the user may have placed an item they own in storage, such as in a cargo container within a storage unit, such that the mobility device travels to the storage to receive the cargo container containing the user's requested item. Although this example corresponds to the cargo transport mode depicted in FIGS. 5A-6B, other suitable modes may be utilized. For example, in power wheelchair mode depicted in FIGS. 2A-2C, an under-seat container may be utilized, which may allow an operator or passenger to accompany the requested item.

At block 704, the cargo container and/or under-seat container that houses one or more requested goods/items is retrieved for delivery by the mobility device. A cargo container may be placed atop a base, another cargo container, or a foot plate of the mobility device. In another embodiment utilizing under-seat container in the power wheelchair mode, the cargo container may be placed under the seat member and atop another cargo container or one/both foot plates. At block 706, the cargo container or under-seat container may be transported to the specified location utilizing any suitable automated navigation (utilizing GPS or the like), remote control by a user or software, or being controlled or otherwise directed by a user aboard the mobility device, such as sitting in the seat member in power wheelchair mode. At block 708, a user may be authenticated by the mobility device, cargo container, and/or under-seat container. Any suitable type of authentication may be utilized, which may include by way of non-limiting examples facial/eye recognition via cameras 102 or 123 (such as the eye scanning depicted in FIG. 6A), voice analysis via microphones 838 (discussed below) or 123, password or fingerprint authentication via screens 104 or 122 which may be touch screens/finger scanners, two-factor authentication (such as sending a code to the user's registered smart phone), and the like.

At block 710, a determination is made as to whether the user is successfully authenticated. If not, then the flowchart returns to 708 where another authentication attempt may be made. In one embodiment, a user may be invited to try another form of authentication if unsuccessful after one or more attempts. In some embodiments, there may be limits placed to bolster security of the cargo, such as only allowing a user to have three attempts at authentication before being blocked from further attempts. If the user is successfully authenticated, then at block 712 the cargo container or under-seat container may unlock or otherwise provide access to the item(s) requested/purchased by the user, as depicted in FIG. 6B. In some embodiments, communications (advertisements, product disclaimers, warranty information, upgrades for purchase, and the like) may be presented to the user visually on the screens of the mobility device or cargo container, via audio through the audio output devices of the mobility device or cargo container, and the like. At block 714, the mobility device departs after the user has received their item/good, or if the user has failed to authenticate. In some embodiments, the user may be given the option to ride, drive, or otherwise utilize the mobility device in any suitable mode, such as power wheelchair mode, power walker mode, power scooter mode, or any suitable mode based upon space availability on the mobility device in view of other cargo containers and/or other under-seat containers that may still be present.

Figure 8:
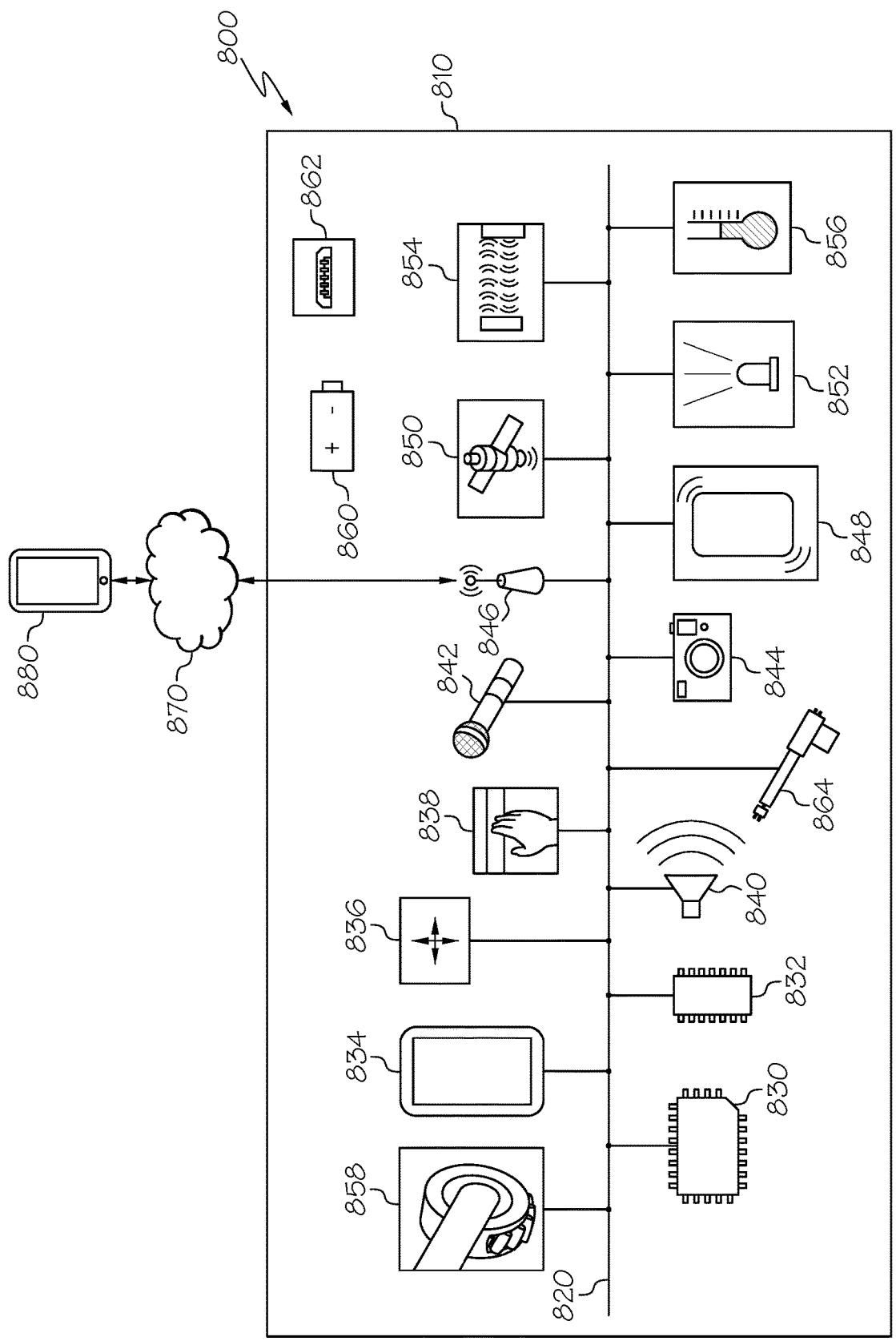
FIG. 8 is a block diagram illustrating hardware utilized in one or more mobility devices for implementing various processes and systems, according one or more embodiments described and illustrated herein.

Turning now to FIG. 8, example components of one non-limiting embodiment of a mobility device 800 is schematically depicted. The mobility device 800 may include a frame 810, a communication path 828, a processor 830, a memory module 832, a display 834, an inertial measurement unit 836, an input device 838, an audio output device 840 (e.g., a speaker), a microphone 842, a camera 844, network interface hardware 846, a tactile feedback device 848, a location sensor 850, a light 852, a proximity sensor 854, a temperature sensor 856, a motorized wheel assembly 858, a battery 860, a charging port 862 and/or an actuator 864. The components of the mobility device 800 other than the frame 810 may be contained within or mounted to the frame 810. The various components of the mobility device 800 and the interaction thereof will be described in detail below.

Still referring to FIG. 8, the communication path 828 may be formed from any medium that is capable of transmitting a signal such as, for example, conductive wires, conductive traces, optical waveguides, or the like. Moreover, the communication path 828 may be formed from a combination of mediums capable of transmitting signals. In one embodiment, the communication path 828 comprises a combination of conductive traces, conductive wires, connectors, and buses that cooperate to permit the transmission of electrical data signals to components such as processors, memories, sensors, input devices, output devices, and communication devices. Accordingly, the communication path 828 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 828 communicatively couples the various components of the mobility device 800. As used herein, the term "communicatively coupled" means that coupled components are capable of exchanging data signals with one another such as, for example, electrical signals via conductive medium, electromagnetic signals via air, optical signals via optical waveguides, and the like. In some embodiments, the mobility device 800 and the cargo containers 118 depicted in FIGS. 5A-6B may each have a communication path 828 wherein various components described herein communicate between the mobility device 800 and the cargo containers 118. In another embodiment, one communication path 828 may be formed between the various components described herein of both the mobility device 800 and a cargo container 118.

The processor 830 of the mobility device 800 may be any device capable of executing machine-readable instructions. Accordingly, the processor 830 may be a controller, an integrated circuit, a microchip, a computer, or any other computing device. The processor 830 may be communicatively coupled to the other components of the mobility device 800 by the communication path 828, such as the various modes 100A-E depicted in FIGS. 1A-6B. For example, a control unit configured to operate the plurality of actuators may be the processor 830. In some embodiments, the processor 830 may be utilized to perform the various functions of the cargo containers 118. Accordingly, the communication path 828 may communicatively couple any number of processors with one another, and allow the components coupled to the communication path 828 to operate in a distributed computing environment. Specifically, each of the components may operate as a node that may send and/or receive data. While the embodiment depicted in FIG. 8 includes a single processor 830, other embodiments may include more than one processor.

Still referring to FIG. 8, the memory module 832 of the mobility device 800 is coupled to the communication path 828 and communicatively coupled to the processor 830. The memory module 832 may, for example, contain instructions to perform authentication 126 of a user 114, as depicted in FIG. 6A. The memory module 832 may comprise RAM, ROM, flash memories, hard drives, or any non-transitory memory device capable of storing machine-readable instructions such that the machine-readable instructions can be accessed and executed by the processor 830. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 832. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 8 includes a single memory module 832, other embodiments may include more than one memory module.

The tactile display 834, if provided, is coupled to the communication path 828 and communicatively coupled to the processor 830. The tactile display 834 may be any device capable of providing tactile output in the form of refreshable tactile messages. A tactile message conveys information to a user by touch. For example, a tactile message may be in the form of a tactile writing system, such as Braille. A tactile message may also be in the form of any shape, such as the shape of an object detected in the environment. The tactile display 834 may provide information to the user regarding the operational state of the mobility device 800.

Any known or yet-to-be-developed display may be used for the display 834, such as LCD, LED, plasma, OLED, CRT, projection, holographic, electronic paper, or any other type of suitable output display which may correspond to the exterior display 104 of the mobility device 800 and/or the cargo container displays 122. In some embodiments, the display 834 is a three dimensional tactile display including a surface, portions of which may raise to communicate information. The raised portions may be actuated mechanically in some embodiments (e.g., mechanically raised and lowered pins). The tactile display 834 may also be fluidly actuated, or it may be configured as an electrovibration tactile display.

The inertial measurement unit 836, if provided, is coupled to the communication path 828 and communicatively coupled to the processor 830. The inertial measurement unit 836 may include one or more accelerometers and one or more gyroscopes. The inertial measurement unit 836 transforms sensed physical movement of the mobility device 800 into a signal indicative of an orientation, a rotation, a velocity, or an acceleration of the mobility device 800. The operation of the mobility device 800 may depend on an orientation of the mobility device 800 (e.g., whether the mobility device 800 is horizontal, tilted, and the like). Some embodiments of the mobility device 800 may not include the inertial measurement unit 836, such as embodiments that include an accelerometer but not a gyroscope, embodiments that include a gyroscope but not an accelerometer, or embodiments that include neither an accelerometer nor a gyroscope.

Still referring to FIG. 8, one or more input devices 838 are coupled to the communication path 828 and communicatively coupled to the processor 830. The input device 838 may be any device capable of transforming user contact into a data signal that can be transmitted over the communication path 828 such as, for example, a button, a switch, a knob, a microphone or the like. In some embodiments, the input device 838 includes a power button, a volume button, an activation button, a scroll button, or the like. The one or more input devices 838 may be provided so that the user may interact with the mobility device 800, such as to navigate menus, make selections, set preferences, and other functionality described herein. In some embodiments, the input device 838 includes a pressure sensor, a touch-sensitive region, a pressure strip, or the like. It should be understood that some embodiments may not include the input device 838. As described in more detail below, embodiments of the mobility device 800 may include multiple input devices disposed on any surface of the frame 810. In some embodiments, one or more of the input devices 838 are configured as a fingerprint sensor for unlocking the robot. For example, only a user with a registered fingerprint may unlock and use the mobility device 800.

The speaker 840 (i.e., an audio output device) is coupled to the communication path 828 and communicatively coupled to the processor 830. The speaker 840 transforms audio message data from the processor 830 of the mobility device 800 into mechanical vibrations producing sound. In some embodiments, the speaker 840 may be utilized to perform audio output for the cargo containers 118, such as requesting authentication or other communication with a user. For example, the speaker 840 may provide to the user navigational menu information, setting information, status information, information regarding the environment as detected by image data from the one or more cameras 844, and the like. However, it should be understood that, in other embodiments, the mobility device 800 may not include the speaker 840.

The microphone 842 is coupled to the communication path 828 and communicatively coupled to the processor 830. The microphone 842 may be any device capable of transforming a mechanical vibration associated with sound into an electrical signal indicative of the sound. The microphone 842 may be used as an input device 838 to perform tasks, such as navigation of the mobility device 800, input settings and parameters, receive spoken commands at cargo containers 118 such as with the authentication device 123, and any other suitable tasks. It should be understood that some embodiments may not include the microphone 842.

Still referring to FIG. 8, the camera 844 is coupled to the communication path 828 and communicatively coupled to the processor 830. The camera 844 may be any device having an array of sensing devices (e.g., pixels) capable of detecting radiation in an ultraviolet wavelength band, a visible light wavelength band, or an infrared wavelength band. The camera 844 may correspond, for example, to the camera 102 of the mobility device 800 and/or the authentication device 123 of the cargo containers 118. The camera 844 may have any resolution. The camera 844 may be an omni-directional camera, or a panoramic camera. In some embodiments, one or more optical components, such as a mirror, fish-eye lens, or any other type of lens may be optically coupled to the camera 844.

The network interface hardware 846 is coupled to the communication path 828 and communicatively coupled to the processor 830. The network interface hardware 846 may be any device capable of transmitting and/or receiving data via a network 870. Accordingly, network interface hardware 846 can include a wireless communication module configured as a communication transceiver for sending and/or receiving any wired or wireless communication. For example, the network interface hardware 846 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 846 includes hardware configured to operate in accordance with the Bluetooth wireless communication protocol. In another embodiment, network interface hardware 846 may include a Bluetooth send/receive module for sending and receiving Bluetooth communications to/from a portable electronic device 880. The network interface hardware 846 may also include a radio frequency identification ("RFID") reader configured to interrogate and read RFID tags.

In some embodiments, the mobility device 800 may be communicatively coupled to a portable electronic device 880 via the network 870. In some embodiments, the network 870 is a personal area network that utilizes Bluetooth technology to communicatively couple the mobility device 800 and the portable electronic device 880. In other embodiments, the network 870 may include one or more computer networks (e.g., a personal area network, a local area network, or a wide area network), cellular networks, satellite networks and/or a global positioning system and combinations thereof. Accordingly, the mobility device 800 can be communicatively coupled to the network 870 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 8, as stated above, the network 870 may be utilized to communicatively couple the mobility device 800 with the portable electronic device 880. The portable electronic device 880 may include a mobile phone, a smartphone, a personal digital assistant, a camera, a dedicated mobile media player, a mobile personal computer, a laptop computer, and/or any other portable electronic device capable of being communicatively coupled with the mobility device 800. The portable electronic device 880 may include one or more processors and one or more memories. The one or more processors can execute logic to communicate with the mobility device 800. The portable electronic device 880 may be configured with wired and/or wireless communication functionality for communicating with the mobility device 800. In some embodiments, the portable electronic device 880 may perform one or more elements of the functionality described herein, such as in embodiments in which the functionality described herein is distributed between the mobility device 800 and the portable electronic device 880.

The tactile feedback device 848 is coupled to the communication path 828 and communicatively coupled to the processor 830. The tactile feedback device 848 may be any device capable of providing tactile feedback to a user. The tactile feedback device 848 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 848.

The location sensor 850 is coupled to the communication path 828 and communicatively coupled to the processor 830. The location sensor 850 may be any device capable of generating an output indicative of a location. In some embodiments, the location sensor 850 includes a global positioning system (GPS) sensor, though embodiments are not limited thereto. Some embodiments may not include the location sensor 850, such as embodiments in which the mobility device 800 does not determine a location of the mobility device 800 or embodiments in which the location is determined in other ways (e.g., based on information received from the camera 844, the microphone 842, the network interface hardware 846, the proximity sensor 854, the inertial measurement unit 836 or the like). The location sensor 850 may also be configured as a wireless signal sensor capable of triangulating a location of the mobility device 800 and the user by way of wireless signals received from one or more wireless signal antennas. In some embodiments, a cargo container 118 may utilize a location sensor 850 to determine its current location in relation to a specified pickup location, as depicted for example in 706 in FIG. 7. In other embodiments, the mobility device 800 may utilize its location sensor 850 to perform this functionality.

The motorized wheel assembly 858 is coupled to the communication path 828 and communicatively coupled to the processor 830. The motorized wheel assembly 858 includes motorized wheels, such as 106 in FIGS. 1-6, that are driven by one or motors. The processor 830 may provide one or more drive signals to the motorized wheel assembly 858 to actuate the motorized wheels such that the mobility device 800 travels to a desired location, such as a location that the user wishes to acquire the cargo 128 as depicted in FIGS. 6A-B (e.g., the location of particular objects within at or near the desired location).

Still referring to FIG. 8, the light 852 is coupled to the communication path 828 and communicatively coupled to the processor 830. The light 852 may be any device capable of outputting light, such as, but not limited to, a light emitting diode, an incandescent light, a fluorescent light, or the like. Some embodiments include a power indicator light that is illuminated when the mobility device 800 is powered on. Some embodiments include an activity indicator light that is illuminated when the mobility device 800 is active or processing data. Some embodiments include an illumination light for illuminating the environment in which the mobility device 800 is located. Some embodiments may not include the light 852.

The proximity sensor 854 is coupled to the communication path 828 and communicatively coupled to the processor 830. The proximity sensor 854 may be any device capable of outputting a proximity signal indicative of a proximity of the mobility device 800 to another object. In some embodiments, the proximity sensor 854 may include a laser scanner, a capacitive displacement sensor, a Doppler effect sensor, an eddy-current sensor, an ultrasonic sensor, a magnetic sensor, an internal sensor, a radar sensor, a lidar sensor, a sonar sensor, or the like. In some embodiments, a cargo container 118 may utilize a proximity sensor 854 to determine whether a user 114 is approaching. In other embodiments, the mobility device 800 may utilize its proximity sensor 854 to perform this functionality. In other embodiments may not include the proximity sensor 854, such as embodiments in which the proximity of the mobility device 800 to an object is determine from inputs provided by other sensors (e.g., the camera 844, the speaker 840, etc.).

The temperature sensor 856 is coupled to the communication path 828 and communicatively coupled to the processor 830. The temperature sensor 856 may be any device capable of outputting a temperature signal indicative of a temperature sensed by the temperature sensor 856. In some embodiments, the temperature sensor 856 may include a thermocouple, a resistive temperature device, an infrared sensor, a bimetallic device, a change of state sensor, a thermometer, a silicon diode sensor, or the like. Some embodiments of the mobility device 800 may not include the temperature sensor 856.

Still referring to FIG. 8, the mobility device 800 is powered by the battery 860, which is electrically coupled to the various electrical components of the mobility device 800. The battery 860 may be any device capable of storing electric energy for later use by the mobility device 800. In some embodiments, the battery 860 is a rechargeable battery, such as a lithium-ion battery or a nickel-cadmium battery. In embodiments in which the battery 860 is a rechargeable battery, the mobility device 800 may include the charging port 862, which may be used to charge the battery 860. Some embodiments may not include the battery 860, such as embodiments in which the mobility device 800 is powered the electrical grid, by solar energy, or by energy harvested from the environment. Some embodiments may not include the charging port 862, such as embodiments in which the apparatus utilizes disposable batteries for power.

The actuator 864 may be coupled to the communication path 828 and the frame 810 of the mobility device and communicatively coupled to the processor 830. One or more actuators 864 may be utilized to move the frame 810 between the plurality of configurations/modes, such as the collapsed transport and storage mode 100A depicted in FIGS. 1A-B, the power wheelchair mode 100B depicted in FIGS. 2A-C, the power walker/telepresence mode depicted in FIGS. 3A-B, the power scooter mode depicted in FIGS. 4A-C, and/or the cargo transport mode 100E depicted in FIGS. 5A-6B. The actuator may also move one or both foot plates. The actuator may also be utilized to control the opening/closing, for example, of the cargo containers 118 as depicted in FIG. 6B.

It should now be understood that embodiments of the present disclosure are directed to a multi-function mobility device that is configurable in a variety of configurations, such as a cargo transport mode. While in the cargo transport mode, the multi-function mobility device can transport interlocking cargo containers that can be used to securely transport items requested by users. The cargo containers may also include displays that can provide further information regarding the item inside.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-function mobility device comprising:
a frame configurable between a plurality of configurations, the frame comprising:
a plurality of individually controllable wheeled leg members configured to traverse uneven terrain, wherein the mobility device is configured to:
transform the frame into a cargo transport configuration of the plurality of configurations that accepts at least two stacks of cargo bins locked together; and
transform the frame into a rideable configuration of the plurality of configurations that accepts a person.

2. The multi-function mobility device of claim 1 wherein the frame is further configured to transform into at least one of a collapsed transport and storage mode, a power wheelchair mode, a power walker mode, and a power scooter mode.

3. The multi-function mobility device of claim 1 configured to transport a plurality of cargo bins of the at least two stacks of cargo bins having data or electrical connections.

4. The multi-function mobility device of claim 3 further comprising a base configured to provide data or electricity to a first cargo bin of the at least two stacks of cargo bins in direct contact with the base.

5. The multi-function mobility device of claim 4 wherein the base is further configured to indirectly provide data or electricity to a second cargo bin of the at least two stacks of cargo bins not in direct contact with the base by utilizing the first cargo bin as a conduit to provide the data or electricity to the second cargo bin.

6. The multi-function mobility device of claim 1 wherein the frame is further configured to transform into a power wheelchair mode that provides space beneath a seat member for a plurality of under-seat containers.

7. The multi-function mobility device of claim 1 further comprising a foot plate attached to each of the wheeled leg members.

8. The multi-function mobility device of claim 7 wherein:
each foot plate is configured to raise and lower with the respective wheeled leg member; and
each footplate is configured to independently support a plurality of stacked cargo bins of the at least two stacks of cargo bins, wherein the footplates are configured to support respective separate stacks of cargo bins of the at least two stacks of cargo bins at different heights.

9. The multi-function mobility device of claim 8 wherein the respective wheeled leg member footplates are configured to adjust the respective footplate heights in response to an uneven surface beneath the multi-function mobility device.

10. The multi-function mobility device of claim 1 further comprising a camera configured to:
authenticate a user; and
based upon the authentication, notify one of the cargo bins of the at least two stacks of cargo bins of the authentication.

11. The multi-function mobility device of claim 10 further comprising an exterior display, a camera, and a microphone, configured to provide videoconference capabilities to the authenticated user.

* * * * *